United States Patent
Fu et al.

(10) Patent No.: US 11,709,882 B2
(45) Date of Patent: Jul. 25, 2023

(54) IMAGE STORAGE SYSTEM FOR IMAGES WITH DUPLICATE PARTS

(71) Applicant: International Business Machines Corporation, Armonk, NY (US)

(72) Inventors: Rong Fu, Ningbo (CN); Wen Wang, Beijing (CN); Jian Dong Yin, Beijing (CN); Hao Sheng, Ningbo (CN); Kang Zhang, Shanghai (CN); Chuan Qing Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/451,788

(22) Filed: Oct. 21, 2021

(65) Prior Publication Data
US 2023/0127690 A1   Apr. 27, 2023

(51) Int. Cl.
*G06F 16/583* (2019.01)
*G06F 16/51* (2019.01)
*G06F 16/54* (2019.01)

(52) U.S. Cl.
CPC .......... *G06F 16/583* (2019.01); *G06F 16/51* (2019.01); *G06F 16/54* (2019.01)

(58) Field of Classification Search
None
See application file for complete search history.

(56) References Cited

U.S. PATENT DOCUMENTS

| 8,983,941 B1 * | 3/2015 | Murphy-Chutorian ...... G06F 16/583 707/723 |
| 9,697,253 B2 | 7/2017 | Chidambaran et al. |
| 10,061,852 B1 | 8/2018 | Plenderleith |

(Continued)

FOREIGN PATENT DOCUMENTS

CN    103593677 A    2/2014

OTHER PUBLICATIONS

"SQL Performance enhancement by local client cache," An IP.com Prior Art Database Technical Disclosure, dated Feb. 29, 2016, 11 pages.
Jomier et al., "Storage and Management of Similar Images," 2000, 13 pages.
Mell et al., "The NIST Definition of Cloud Computing", Computer Security Division, National Institute of Standards and Technology, Jan. 2011, 7 pages.

(Continued)

*Primary Examiner* — Giuseppi Giuliani
(74) *Attorney, Agent, or Firm* — Yee & Associates, P.C.

(57) ABSTRACT

Managing an image storage space is provided. A number of processor units identifies a benchmark image in a similar images group. A number of other images not identified in the similar images group as the benchmark image is a set of similar images. The number of processor units creates an image mapping tree. The image mapping tree has a root block for the benchmark image and blocks arranged in a set of layers below the root block based on the set of similar images; the blocks represent portions of the benchmark image; and a plurality of lower blocks in the blocks in a lower layer correspond to subdivisions in an upper block in the blocks in an upper layer. The number of processor units stores a set of selected blocks in the set of similar images that (Continued)

have differences from a set of corresponding blocks in image mapping tree for the benchmark image. The number of processor units store metadata for the set of selected blocks that describes set of paths in the image mapping tree from the set of corresponding blocks in the image mapping tree to the root block.

25 Claims, 16 Drawing Sheets

(56) References Cited

U.S. PATENT DOCUMENTS

| | | | |
|---|---|---|---|
| 2009/0303251 | A1 | 12/2009 | Balogh et al. |
| 2011/0007094 | A1 | 1/2011 | Nash et al. |
| 2015/0286674 | A1 | 10/2015 | Martin et al. |
| 2017/0046595 | A1 | 2/2017 | Dwan et al. |
| 2020/0210707 | A1* | 7/2020 | Jia .......................... G06V 20/49 |
| 2021/0173888 | A1 | 6/2021 | Flack et al. |

OTHER PUBLICATIONS

Xie et al., "PXDedup: Deduplicating Massive Visually Identical JPEG Image Data," Big Data Research, vol. 23, 2021, 9 pages.

Zhou et al., "Fast and accurate near-duplicate image elimination for visual sensor networks," International Journal of Distributed Sensor Networks, vol. 13(2), 2017, 12 pages.

Zhou et al., "Near-Duplicate Image Detection System Using Coarse-to-Fine Matching Scheme Based on Global and Local CNN Features," Mathematics, vol. 8, 2020, 16 pages.

PCT International Search Report and Written Opinion, dated Jan. 25, 2023, regarding Application No. PCT/EP2022/078488, 11 pages.

Tzouramanis et al.,"Time Split Linear Quadtree for Indexing Image Databases", Proceedings 2001 International Conference On Image Processing (ICIP 2001), vol. 2, Thessaloniki, Greece, Oct. 7-10, 2001, 4 pages. DOI: 10.1109/ICIP.2001.958598; ISBN: 978-0-7803-6725-8; Section 2.2; p. 734; figures 2a, 2b.

Li et al., "Partial Near-Duplicate Image Identification with Global Geometric Consistency of Subset-of-features," 2011 International Conference on Computer Science and Network Technology, Dec. 24-26, 2011, 5 pages.

\* cited by examiner

IMAGE STORAGE SYSTEM FOR IMAGES WITH DUPLICATE PARTS

BACKGROUND

1. Field

The disclosure relates generally to improve computer system and more specifically to a computer system that efficiently stores images with duplicate parts

2. Description of the Related Art

With the development of the Internet and social networking platforms, massive amounts of information are stored. Images can comprise a large proportion of the information stored on social networking platforms. For example, users of social media platforms can upload very large numbers of images such as upwards of 1.8 billion images per day. Storage of images on the Internet can occur for creating training data sets for image recognition training for artificial intelligence systems and other purposes for which large numbers of images may be required.

Storing these images takes massive amounts of storage space and involves large costs. In managing the storage space for images, compression techniques can be applied to images to reduce the amount of storage space. Data compression can be applied to digital images to reduce the size of the images, resulting in reduced cost for storage or transmission. With compression of images, the compression can be lossy or lossless. Lossless compression is preferred but may not produce image sizes as much as desired.

Further, in managing storage space for images, duplicate images can be identified. With identification of duplicate images, deduplication can be performed to remove duplicate copies of images. One image can be retained as shared copy. However, as the number of images stored continue to rapidly increase, deduplication of identical images may not provide a desired reduction in storage space for images.

SUMMARY

According to one illustrative embodiment, a computer implemented method for managing an image storage space is provided. A number of processor units identifies a benchmark image in a similar images group. A number of other images not identified in the similar images group as the benchmark image in a set of similar images. The number of processor units creates an image mapping tree. The image mapping tree has a root block for the benchmark image and blocks arranged in a set of layers below the root block based on the set of similar images. The blocks represent portions of the benchmark image, and a plurality of lower blocks in the blocks in a lower layer correspond to subdivisions in an upper block in the blocks in an upper layer. The number of processor units stores a set of selected blocks in the set of similar images that have differences from a set of corresponding blocks in image mapping tree for the benchmark image. The number of processor units store metadata for the set of selected blocks that describes a set of paths in the image mapping tree from the set of corresponding blocks in the image mapping tree to the root block. According to other illustrative embodiments, a computer system and a computer program product for managing an image storage space are provided. As a result, the illustrative embodiments can provide a technical effect of increasing performance in a computer system by reducing the amount of image storage space needed through storing portions of similar images.

The illustrative embodiments can also permissively store a set of new blocks for a new image that is different from a set of new corresponding blocks in the benchmark image in the image mapping tree and store new meta data for the set of new blocks that describe a set of new paths from the set of new corresponding blocks in the image mapping tree to the root block for the benchmark image in the image mapping tree. The illustrative embodiments further permissively store a set of new images using the image mapping tree if the set of new images is within a maximum threshold of images for the image mapping tree. The illustrative embodiments can also permissively recreate the image mapping tree using the new set of images and images in the similar images group if the new set of images is equal to or greater than a new image threshold. In creating the image mapping tree for the similar images group, the illustrative embodiments permissively split the benchmark image to form subdivisions in the benchmark image and create an upper layer of upper blocks in a layer under the root block in which each upper block in the upper blocks corresponds to a subdivision in the subdivisions in the benchmark image. In creating the image mapping tree for the similar images group, the illustrative embodiments permissively further determine, a number of similar images in the set of similar images that have a similar block that is different from a corresponding upper block in the upper blocks to form a set of corresponding upper blocks; split each corresponding upper block in set of corresponding upper blocks into the subdivisions; and create a lower layer of lower blocks in which each lower block in the lower blocks corresponds to the subdivision in the subdivisions in the set of corresponding upper blocks. As a result, the illustrative embodiments provided technical effect that enables reducing storage for similar images through the use of an image mapping tree to store blocks of similar images and metadata for the blocks.

In another illustrative example, a computer implement method for managing image storage space is provided. A number of processor units receives a new image for storage using an image mapping tree having a root block for a benchmark image and blocks arranged in a set of layers below the root block based on a set of similar images. The blocks represent portions of the benchmark image in a plurality of lower blocks and the blocks in a lower layer correspond to subdivisions in a block in the blocks in an upper layer. The number of processor units store a set of new blocks for the new image that is different from a set of corresponding blocks in the image mapping tree. The number of processor units store new meta data for the set of new blocks that describes a set of new paths from the set of corresponding blocks in the image mapping tree to the root block for the benchmark image in the image mapping tree. According to other illustrative embodiments, a computer system and a computer program product for managing an image storage space are provided. As a result, the illustrative embodiments can provide a technical effect of increasing performance in a computer system by reducing the amount of image storage space needed through storing portions of similar images.

DETAILED DESCRIPTION

Figure 1:
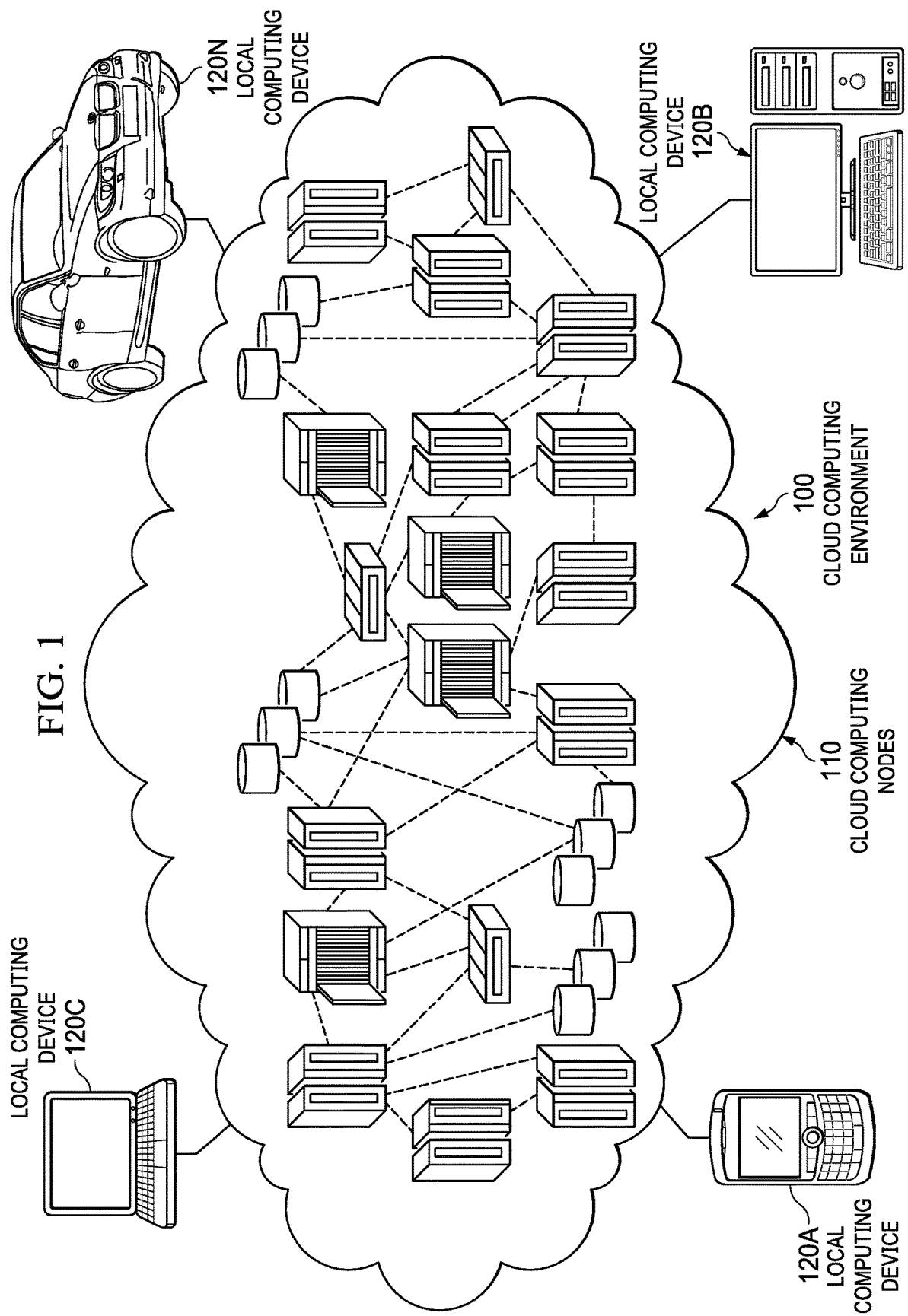
FIG. 1 is a diagram illustrating a cloud computing environment in which illustrative embodiments may be implemented.

The illustrative embodiments recognize and take into account a number of different considerations. For example, illustrative embodiments recognize and take into account that it can be difficult to handle images that have some duplicate portions when attempting to reduce storage space. Those embodiments recognize and take into account that it is necessary to store all of the images even though duplicate parts are present between images. The illustrative environments recognize and take into account that this situation is a common issue in different scenarios including cloud storage, social networking platforms, image recognition training data, and other scenarios.

Therefore, it would be desirable to have a computer implemented method, apparatus, computer system, and computer program product that take into account at least some of the issues discussed above, as well as other possible issues. For example, it would be desirable to have a method and apparatus that overcome a technical problem with managing the storage of images in one, where duplicate portions are present between the images.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is illustrated in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
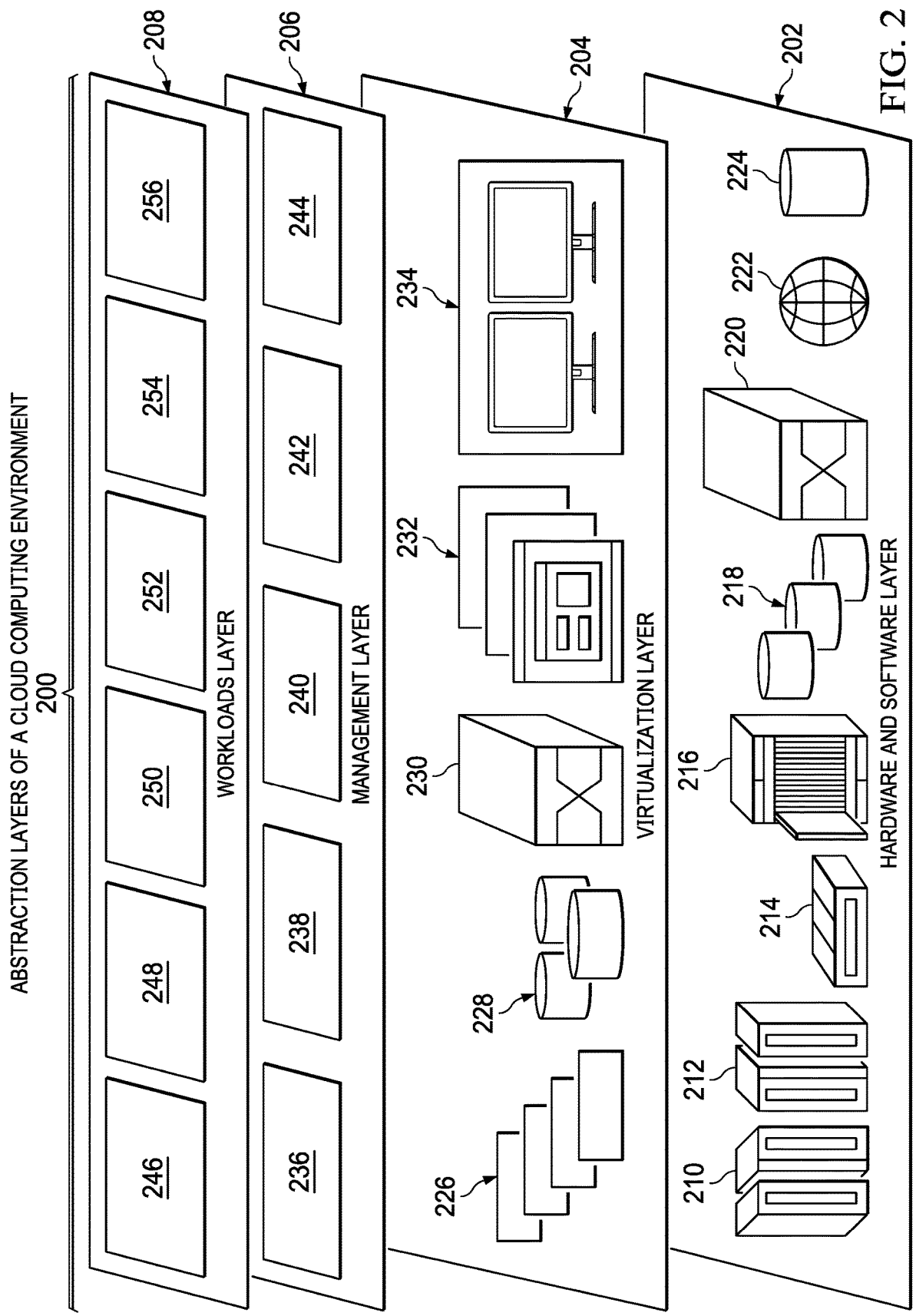
FIG. 2 is a diagram illustrating abstraction model layers in accordance with an illustrative embodiment.

With reference now to FIG. 2, a diagram illustrating abstraction model layers is illustrated in accordance with an illustrative embodiment. The set of functional abstraction layers shown in this illustrative example may be provided by a cloud computing environment, such as cloud computing environment 100 in FIG. 1.

As used herein, a "set of" when used with reference to items means one or more items. For example, a set of functional abstraction layers is one or more functional abstraction layers.

It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. For example, workloads and functions, which may be provided by workload layer 208, may include mapping and navigation 246, software development and lifecycle management 248, virtual classroom education delivery 250, data analytics processing 252, transaction processing 254, and image management 256.

In this illustrative example, image management 256 manages the storage of images in cloud computing environment 100. Image management 256 can manage the storage in a manner that reduces the storage space needed for images that have some duplicate portions.

Figure 3:
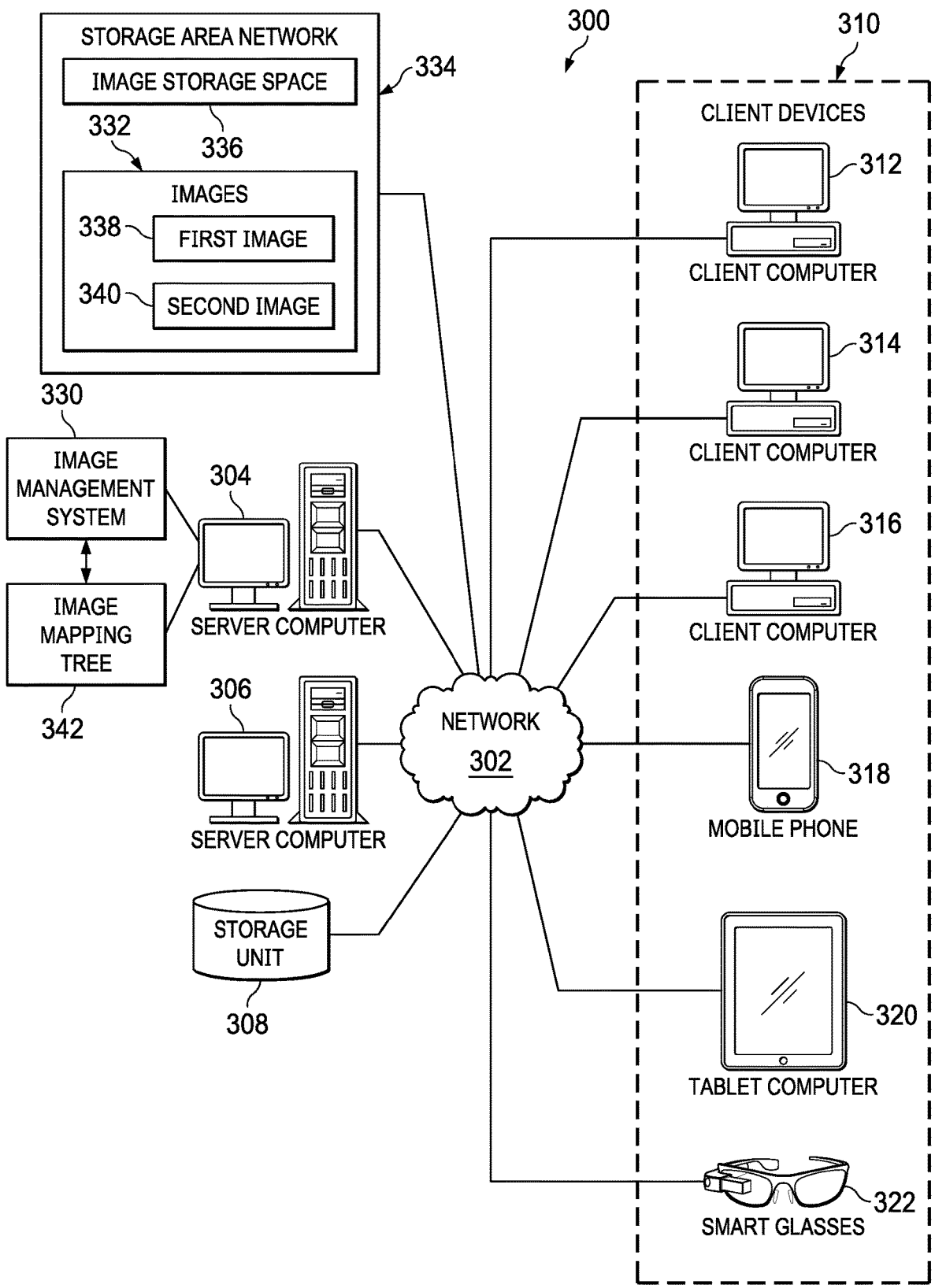
FIG. 3 is a pictorial representation of a network of data processing systems in which illustrative embodiments may be implemented.

With reference now to FIG. 3, a pictorial representation of a network of data processing systems is illustrated in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wire, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, image management system 330 can manage the storage of images 332 in storage area network (SAN) 334. Storage area network 334 is a network of storage devices that can be accessed via network 302. As depicted, image management system 330 can manage image storage space 336 in storage area network 334 when storing images 332.

As depicted, image management system 330 can handle storing images 332 that have duplicate parts using less space than storing all the images with duplicate parts. For example, both first image 338 and second image 340 can be split into blocks. This splitting of first image 338 and second image 340 can be performed such that second image 340 has blocks that correspond to blocks in first image 338. For example, both images can be split in a 2×2 such that each image has 4 blocks. This example assumes both images have the same size. This splitting of first image 338 and second image 340 can is such that each block in first image 338 has a corresponding block in second image 340.

In managing image storage space 336, image management system 330 can store first image 338 in storage area network 334. With respect to second image 340, image management system 330 can compare a block in second image 340 to a corresponding block in first image 338. If the block in second image 340 is the same as the corresponding block in first image 338, that block in second image 340 is not saved in storage area network 334. If a block in second image 340 is similar but not the same as the corresponding block in first image 338, that block in second image 340 is saved in storage area network 334. Metadata can also be stored for that block to identify the correspondence between blocks stored for second image 340 and corresponding blocks in first image 338. As a result, less storage space is needed in handling images that may be similar enough duplicates of each other.

In this example, this analysis can be facilitated using image mapping tree 342 which has layers that provide an ability to map a block that is stored for second image 340 to the corresponding block in first image 338. As a result, the amount of space needed in image storage space 336 to store images 332 can be reduced when similar images are present in images 332.

This reduction in the use of image storage space 336 can provide an ability to store more images in the same amount of storage space. Further, the speed and transferring of images can be increased through the ability to transfer only portions of an image when images similar to each other transfer over network 302.

An illustration of the management of images 332 and storage area network 334 by image management system 330 is presented as one manner in which the storage of images 332 can be managed in accordance with an illustrative example. This illustration is not meant to limit the manner in which other list of examples can be implemented. For example, in another relative example, a solid-state disk drive connected to server computer 304 can be used in place of storage area network 334. Further, multiple storage components distributed through network 302 can store images 332 in yet another illustrative example.

Figure 4:
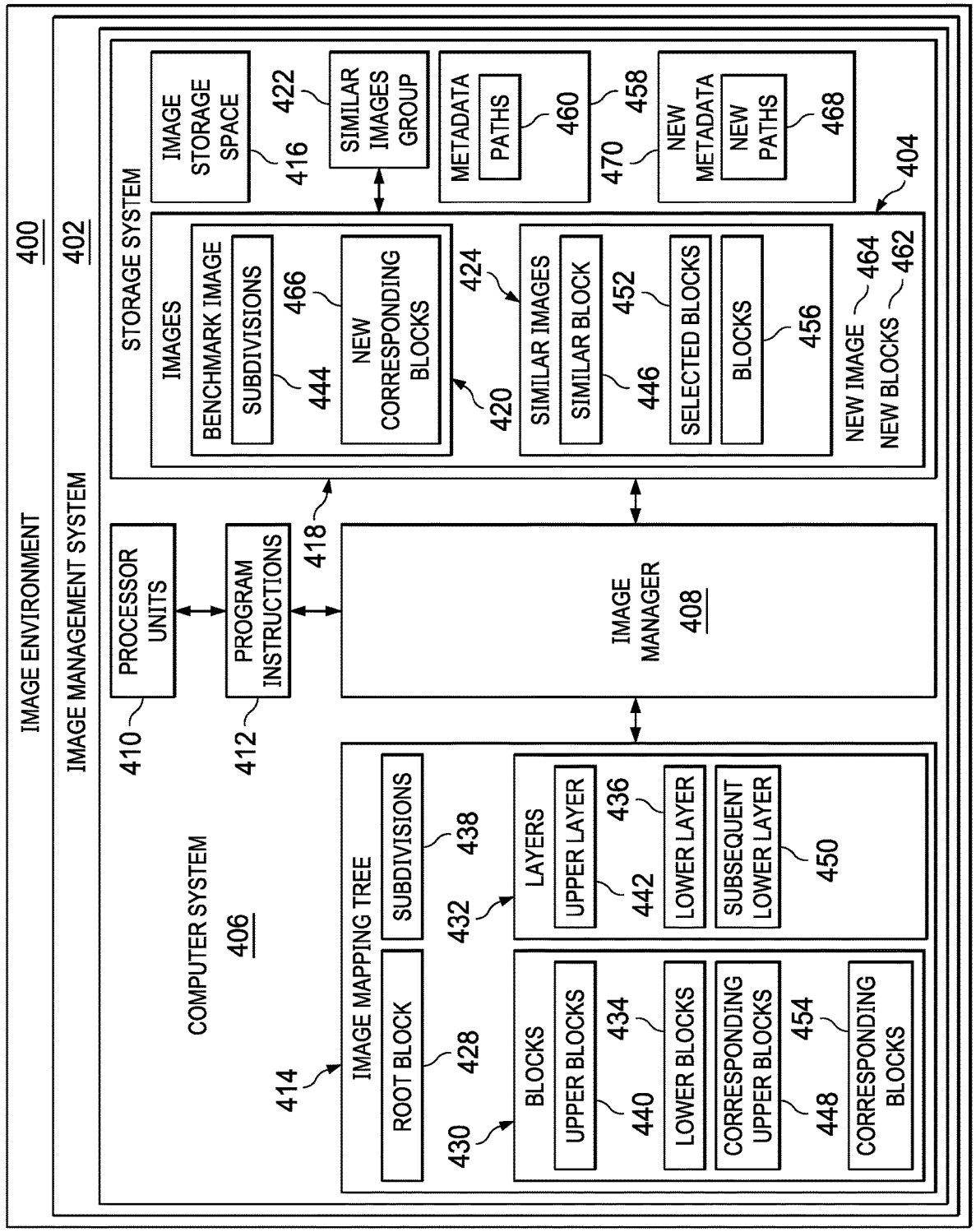
FIG. 4 is a block diagram of an image environment in accordance with an illustrative embodiment.

With reference now to FIG. 4, a block diagram of an image environment is illustrated in accordance with an illustrative embodiment. In this illustrative example, image environment 400 includes components that can be implemented in hardware such as the hardware shown in network data processing system 300 in FIG. 3. Image management system 402 can manage images 404 in image environment 400.

As depicted, image management system 402 comprises computer system 406 and image manager 408. Image manager 408 is located in computer system 406.

In this illustrative example, image manager 408 can be implemented in software, hardware, firmware or a combination thereof. When software is used, the operations performed by image manager 408 can be implemented in program instructions configured to run on hardware, such as a processor unit. When firmware is used, the operations performed by image manager 408 can be implemented in program instructions and data and stored in persistent memory to run on a processor unit. When hardware is employed, the hardware can include circuits that operate to perform the operations in image manager 408.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 406 is a physical hardware system and includes one or more data processing systems. When more than one data processing system is present in computer system 406, those data processing systems are in communication with each other using a communications medium. The communications medium can be a network. The data processing systems can be selected from at least one of a computer, a server computer, a tablet computer, or some other suitable data processing system.

As depicted, computer system 406 includes a number of processor units 410 that are capable of executing program instructions 412 implementing processes in the illustrative examples. As used herein, a processor unit in the number of processor units 410 is a hardware device and is comprised of hardware circuits such as those on an integrated circuit that respond and process instructions and program code that operate a computer. When a number of processors units 410 execute program instructions 412 for a process, the number of processors units 410 is one or more processors units that can be on the same computer or on different computers. In other words, the process can be distributed between processors units on the same or different computers in a computer system. Further, the number of processors units 410 can be of the same type or different type of processors units. For example, a number of processors units can be selected from at least one of a single core processor, a dual-core processor, a multi-processor core, a general-purpose central processing unit (CPU), a graphics processing unit (GPU), a digital signal processor (DSP), or some other type of processor unit.

In this example, image manager 408 uses image mapping tree 414 to manage image storage space 416 in storage system 418 for storing images 404. As depicted, storage system 418 can be one or more storage devices. For example, storage system 418 can comprise at least one of a network attached storage (NAS), storage area network (SAN), a memory, a disk drive, a solid-state (SSD), a disk array, or other type of storage. When more than one storage components are present, those components can be connected to each other through a communications link or network.

In the illustrative example, image manager 408 identifies benchmark image 420 in a similar images group 422. In this illustrative example, similar images group 422 includes two or more of images 404. A number of other images not identified in similar images group 422 as the benchmark image 420 is a set of similar images 424. In this altered example, images in the set of similar images 424 can be considered to be similar because portions of these images can be the same between two or more images within similar images group 422.

In this altered example, benchmark image 420 can be determined from a plurality of similar images in similar images group 422 based on a minimum overall difference between the plurality of similar images. In this example, the plurality of similar images comprises benchmark image 420 and the set of similar images 424 in similar images group 422. For example, the minimum overall difference can be determined by using at least one of a RGB color histogram method, a keypoint matching method, an image hash method, a compute the bits method, or other suitable technique.

Image manager 408 creates image mapping tree 414. In this illustrative example, image mapping tree 414 is a hierarchical structure.

As depicted, image mapping tree 414 has root block 428 for benchmark image 420 and blocks 430 arranged in a set of layers 432 below root block 428 based on the set of similar images 424. In this illustrative example, blocks 430 represent portions of the benchmark image 420. A plurality of lower blocks 434 in blocks 430 in lower layer 436 correspond to subdivisions 438 in upper blocks 440 in blocks 430 in upper layer 442. In this illustrative example, the plurality of lower blocks 434 can be a subset of blocks 430 that are in lower layer 436. For example, if a block in upper layer 442 is split into 4 subdivisions, for pluralities of blocks 430 are present in lower layer 436 that correspond to the block in upper layer 442. Each plurality of blocks 430 represent some corresponding block in upper layer 442.

In this illustrative example, each block in blocks 430 represents a portion or subdivision of benchmark image 420. Blocks 430 in lower layers have a higher granularity as compared to blocks 430 in upper layers in layers 432 in image mapping tree 414. In other words, a block in lower layer 436 corresponds to a smaller portion of benchmark image 420 as compared to a block in upper layer 442.

In creating image mapping tree 414, image manager 408 splits benchmark image 420 to form subdivisions 444 in benchmark image 420. Subdivisions can correspond to blocks 430 in layers 432. Image manager 408 creates upper layer 442 of upper blocks 440 in a layer under root block 428 in which each upper block in the upper blocks 440 corresponds to a subdivision in subdivisions 444 in benchmark image 420.

Image manager 408 can determine a number of similar images 424 in the set of similar images 424 that have similar block 446 that is different from corresponding upper block 448 in upper blocks 440 to form a set of corresponding upper blocks 448. Image manager 408 can split each corresponding upper block in the set of corresponding upper blocks 448 into subdivisions 438. Additionally, image manager 408 can create lower layer 436 of lower blocks 434 in which each lower block in lower blocks 434 corresponds to the subdivision in subdivisions 438 in the set of corresponding upper blocks 448.

The number of blocks 430 form from splitting an upper block can be based on the number of similar images 424 having a similar upper block for the upper block being split. For example, if the upper block being split has 5 similar images that have that upper block, the upper block can be split into 9 lower blocks. As another example, if the upper block being split has 2 similar images that have that upper block, the upper block can be split into 4 lower blocks. In other illustrative examples, and upper block can be split into 16, 25, 36, or some other number of blocks 430. As a result, the number of blocks created from splitting can be based on the number of similar images that have similar upper block being split.

In this illustrative example, when performing determining, splitting, and creating steps to form subsequent lower layer 450, lower blocks 434 become upper blocks 440 when creating subsequent lower layer 450. This process the determining, splitting, and creating can be repeated a number of different times to form subsequent lower layers.

The number of subsequent lower layers created can be based on storage reduced and processing resources used. As the number of lower layers increase, the time to image mapping tree 414 increases and the size of metadata used to store blocks increases. These factors can be used to determine how many subsequent lower layers are created. The consideration of how much storage is reduced for images by creating additional lower layers versus the amount of processing resources use to create those layers, traverse image mapping tree 414 with those layers, collecting and storing metadata can be used to determine how many subsequent lower layers are used. These parameters can be used in generating conditions for determining how many lower layers are created. These conditions include, for example, at least one of a ratio of time to space, a threshold of time, and a threshold for a maximum number of layers in image mapping tree 414.

Image mapping tree 414 can be used to map portions of the set of similar images 424 to benchmark image 420. In one illustrative example, image manager 408 can store a set of selected blocks 452 in the set of similar images 424 that have differences from a set of corresponding blocks 454 in image mapping tree 414 for the benchmark image 420. Blocks 456 from similar images 424 can be stored rather than entire images. Blocks 456 correspond to blocks or subdivisions 444 for benchmark image 420. In other words, portions of the image that are not exactly the same as the corresponding portion of benchmark image 420 are saved.

Additionally, image manager 408 stores metadata 458 for the set of selected blocks 452 that describes set of paths 460 in image mapping tree 414 from the set of corresponding blocks 454 in image mapping tree 414 to root block 428.

Further, image mapping tree 414 can be used to store new images. For example, image manager 408 can store a set of new blocks 462 for new image 464 that is different from a set of new corresponding blocks 466 for benchmark image 420 in image mapping tree 414. Additionally, image manager 408 can store new meta data 470 for the set of new blocks 462 that describe a set of new paths 468 from the set of new corresponding blocks 466 in image mapping tree 414 to root block 428 for benchmark image 420 in image mapping tree 414.

Further, image manager 408 can selectively store new images. For example, image manager 408 can store a set of new images using image mapping tree 414 if the set of new images is less than a new image threshold for images for the image mapping tree 414. If the set of new images is greater than the maximum threshold of images for image mapping tree 414, image manager 408 can recreate image mapping tree 414 using the new set of images and images 404 in the similar images group 422 if the new set of images is equal to or greater than a new image threshold.

In one illustrative example, one or more technical solutions are present that overcome a technical problem with image storage space when storing images. As a result, one or more technical solutions may provide a technical effect reducing the amount of storage space needed to store similar images that are not duplicates of each other. In one illustrative example, one or more technical solutions are present that provided a technical effect that enables storing portion of images that are different from a benchmark image such that the image storage space needed to store the images and the benchmark image are reduced as compared to current techniques for storing images. Further, one or more technical solutions can also be used in conjunction with current techniques for reducing the use of image storage space such as image compression techniques. Additionally, one or more technical solutions provide a technical effect for reducing the amount of image storage space needed. As a result, the illustrative embodiments provided technical effect that enables reducing storage for similar images through the use of a image mapping tree to store blocks of similar images and metadata for the blocks such that only portions of images are saved.

Computer system 406 can be configured to perform at least one of the steps, operations, or actions described in the different illustrative examples using software, hardware, firmware or a combination thereof. As a result, computer system 406 operates as a special purpose computer system in which image manager 408 in computer system 406 enables managing storage space using decision trees to more efficiently store similar images. In particular, image manager 408 transforms computer system 406 into a special purpose computer system as compared to currently available general computer systems that do not have image manager 408.

In the illustrative example, the use of image manager 408 in computer system 406 integrates processes into a practical application for managing image storage space that increases the performance of computer system 406 by enabling similar images using less storage space through storing portions of the similar images that are similar to corresponding portions of the benchmark image while other portions of the similar images that are the same as the corresponding portions of the benchmark image are not stored. In other words, image manager 408 in computer system 406 is directed to a practical application of processes integrated into image manager 408 in computer system 406 that one or more image mapping trees to store images. The use of decision trees can store portions of images that are similar to other images from which the decision tree was created. In the illustrative examples, the decision trees enable image manager 408 to store blocks for portions of images. As a decision tree has more layers, increasing granularity is present which can result in increased saving in the amount of image storage space that is used.

In this illustrative example, image manager 408 in computer system 406 can save images using a decision tree in a manner that results in improvement in the performance of computer system 406 and in particular to improving storage space usage for storing images in computer system 406. In this manner, image manager 408 in computer system 406 provides a practical application for managing image storage space such that the functioning of computer system 406 is improved.

The illustration of image environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more image mapping trees may be created and present in addition to or in place of image mapping tree 414. With this example, different image mapping trees can have different benchmark images for different similar images groups. In this manner, new images can be matched up with an appropriate image mapping tree for increased efficiency and storing the new images.

Figure 5:
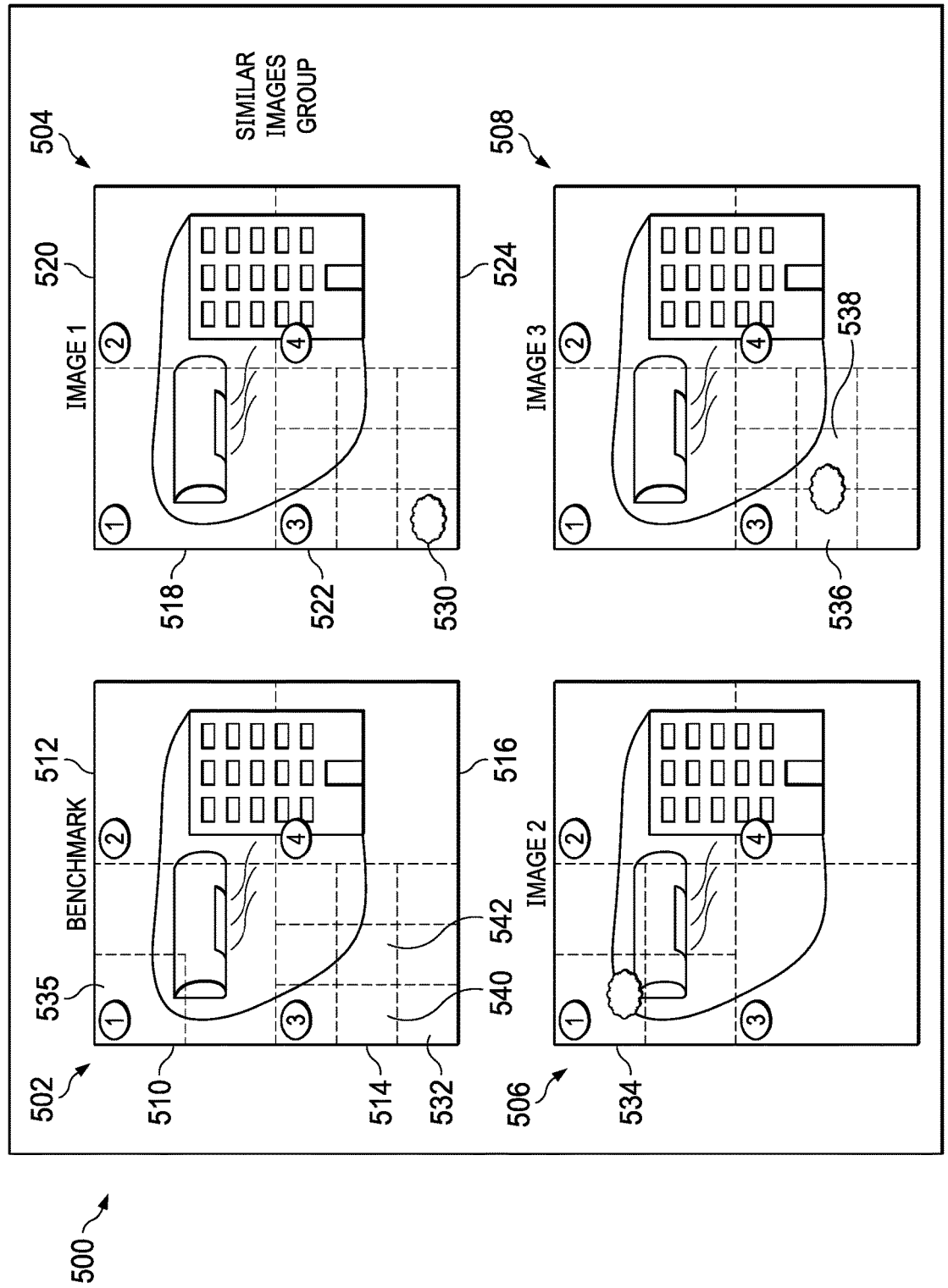
FIG. 5 is an illustration of a similar images group in accordance with an illustrative embodiment.

Turning now to FIG. 5, an illustration of a similar images group is illustrated in accordance with an illustrative embodiment. For example, similar images group 500 is an example of similar images group 422 shown in block form in FIG. 4. In this illustrative example, similar images group 500 comprises four images: benchmark image 502, image 1 504, image 2 506, and image 3 508. Benchmark image 502 is an example of benchmark image 420 in FIG. 4. Image 1 504, image 2 506, and image 2 508 are examples of similar images 424 in FIG. 4.

As depicted, benchmark image 502 can be split or subdivided into subdivisions. In this example, the subdivisions are 4 blocks: block 1 510, block 2 512, block 3 514, and block 4 516. In this illustrative example, these blocks can also be referred to as subdivisions.

In the illustrative example, image 1 504, image 2 506, and image 3 508 are also split into blocks that correspond to the blocks created from splitting benchmark image 502 for comparison to determine which portions of these images should be stored and what portions do not need to be stored. The comparisons are made to determine blocks from a particular image are different from corresponding blocks in benchmark image 502.

In this illustrative example, image 1 504 has 4 blocks: block 1 518, block 2 520, block 3 522, and block 4 524. As depicted, block 1 518 corresponds to block 1 510, block 2 520 corresponds to block 2 512, block 3 522 corresponds to block 3 514, and block 4 524 corresponds to block 4 516.

In this particular example, block 1 518 is the same as block 1 510, block 2 520 is the same as block 2 512, and block 4 524 is the same as block 4 516. However, between image 1 504 and benchmark image 502, block 3 522 is not the same as block 3 514.

In storing image 1 504, block 1 518, block 2 520, and block 4 524 do not need to be stored because these blocks are the same as the corresponding blocks created from subdividing benchmark image 502. Block 3 522 in image 1 504 is stored because this block is not the same as the corresponding block, block 3 514, in benchmark image 502.

In this illustrative example, further savings in storing image 1 504 can be achieved by further subdividing block 3 514 and block 3 522 for comparison. In this example, each of these blocks can be split into nine blocks with the corresponding blocks being compared to each other. With this comparison, all of the blocks are the same except for block 530 in image 1 504 in the corresponding block, block 532 in benchmark image 502. As a result, this further splitting of blocks increases the granularity and reduces the amount of storage needed.

The identification of images and the identification of subdivisions in the form of blocks created from splitting images can be managed using an image mapping tree. This image mapping tree can be used to identify the location of stored blocks and images relative to the corresponding blocks form from subdividing benchmark image 502.

With this example, block 534 in image 2 506 is saved along with metadata identifying the location corresponding block, block 535 benchmark image 502. As another example, block 536 and block 538 are saved in image 3 508. Metadata identifying the corresponding locations, block 540 and block 542 and benchmark image 502 are saved provided mapping of the corresponding box between image 3 508 and benchmark image 502.

Figure 6:
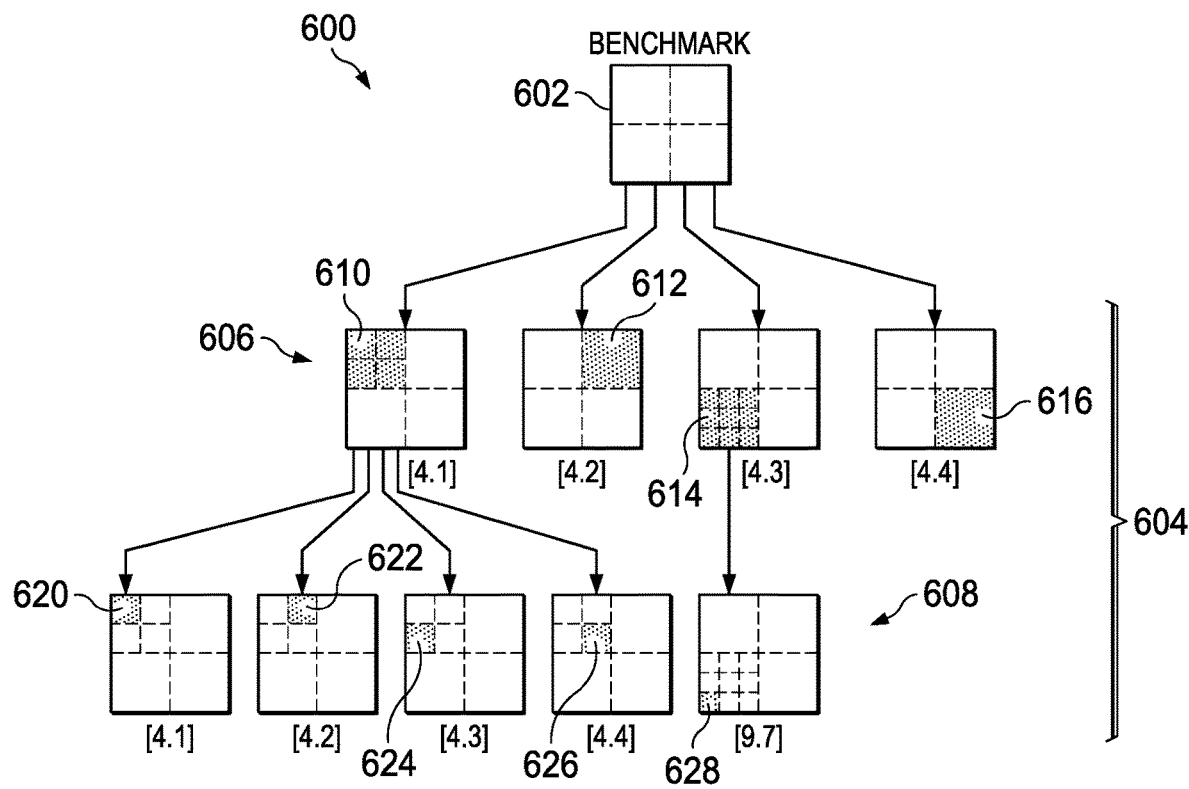
FIG. 6 is an image mapping tree in accordance with an illustrative embodiment.

With reference to FIG. 6, an image mapping tree is illustrated in accordance with an illustrative embodiment. In the social example, image mapping tree 600 is an example of image mapping tree 414 shown a block form in its FIG. 4. Image mapping tree 600 can be created using similar images group 500 in FIG. 5.

As depicted, image mapping tree 600 has root block 602 and layers 604. In this example, layer 604 comprises a first layer 606 and a second layer 608. First layer 606 is an example of upper layer 442 in FIG. 4 and second layer 608 is an example of lower layer 436 in FIG. 4.

Each successive layer provides additional granularity in subdividing an image. For example, benchmark image 502 in FIG. 5 can be subdivided into four blocks or subdivisions for root block 602 in image mapping tree 600. These splitting of benchmark image 502 into 4 subdivisions can be represented in blocks in first layer 606. As depicted, first layer 606 comprises block 1 610, block 2 612, block 3 614, and block 4 616. Each of these blocks corresponds to a subdivision of benchmark image 502 in root block 602.

In second layer 608, the blocks in first layer 606 can be split again into additional subdivisions such that groups of blocks within second layer 608 correspond to subdivisions within blocks in first layer 606. For example, block 1 610 in first layer 606 can be divided into 4 subdivisions. The subdivisions of block 1 610 represented in second layer 608 as a group of blocks comprising block 1 620, block 2 622, block 3 624, and block 4 626. In other words, these 4 blocks in second layer 608 have corresponding subdivisions within block 610.

The number of subdivisions made for blocks in first layer 606 do have to be the same. As depicted, block 614 can be subdivided into nine subdivisions instead of four subdivisions. As a result, the group of blocks for block 614 can be 9 blocks in second layer 608. In this example, only one block, block 7 628, out of 9 blocks are shown and second layer 608. Further, groups of blocks for block 2 612 and block 4 616 are also not shown in this illustration of image mapping tree 600. These other blocks are not shown in second layer 608 to avoid obscuring the illustration and description of features in the illustrative example.

In this example, each block on each level has an identifier indicating the position of the block relative to a corresponding block on an upper level. These identifiers can be used to generate metadata to identify path from a block that is saved for an image to the root block. These identifiers the path can be used to identify the particular block for benchmark image 502 that corresponds to the block saved for the image that is being saved without saving the entire image.

For example, block 1 610 has label [4.1], block 2 612 has label [4.2], block 3 614 has label [4.3], and block 4 616 has label [4.4]. As another example, block 7 628 has label [9.7]. In this example, the first number in the label indicates subdivisions are present from the block in the upper layer. The second number in the label indicates the position of the block within the subdivisions.

For example, in FIG. 5, for image 1 504, the position of block 530 in image 1 504 and the position of this block in benchmark image 502 can be represented as new block [4.3, 9.7]. This metadata indicates the path from block 7 628 to block 1 614 and then to root block 602. As a result, block 530 can be saved along with metadata in this example, the metadata is a reference to benchmark image 502 and new block [4.3, 9.7].

Figure 7:
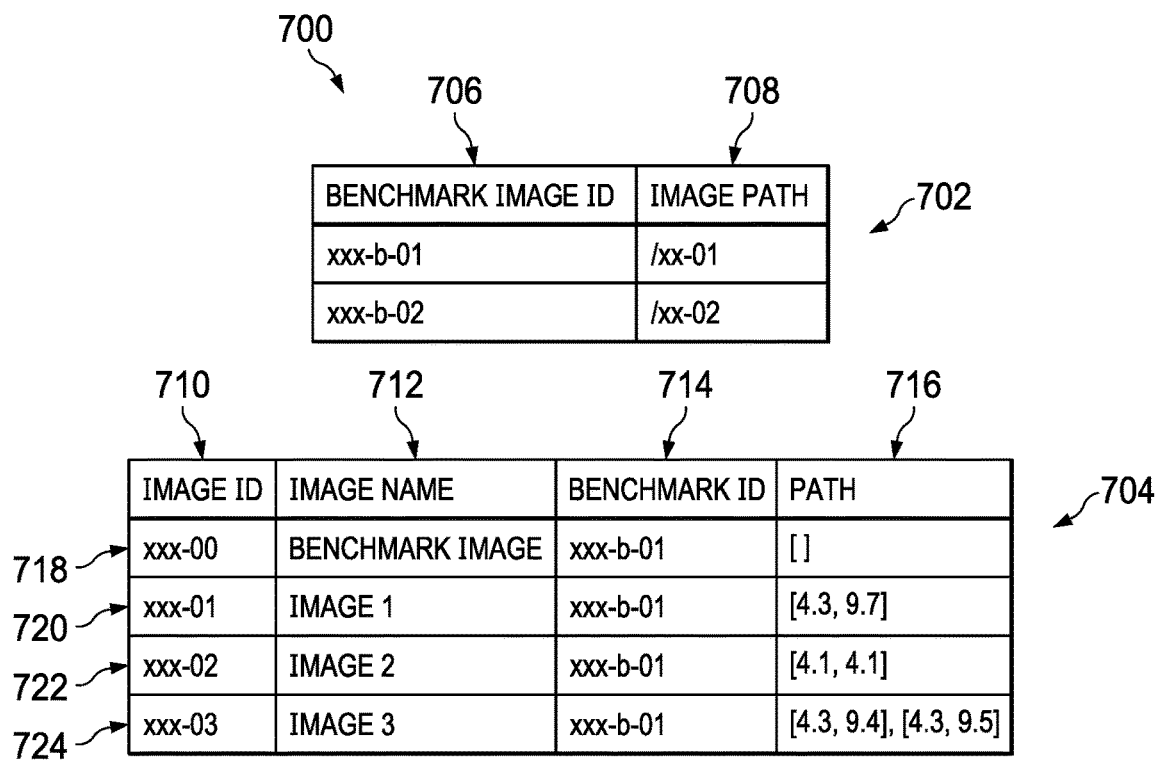
FIG. 7 is metadata used to describe blocks saved for an image in accordance with an illustrative embodiment.

With reference next to FIG. 7, metadata used to describe blocks saved for an image is illustrated in accordance with an illustrative embodiment. Metadata 700 is an example of metadata 458 shown in block form in FIG. 4. In this illustrative example, metadata 700 is generated from storing image 1 504, image 2 506, and image 3 508 in FIG. 5 using image mapping tree 600 in FIG. 6.

As depicted, metadata 700 can be organized as table 702 and table 704. Table 702 identifies benchmark images. Table 702 has columns comprising benchmark image ID 706 and image path 708. Benchmark image ID 706 identifies the benchmark image, and image path 708 identifies the location of the benchmark image.

In the illustrative example, table 704 has columns comprising image ID 710, image name 712, benchmark ID 714, and path 716. Image ID 710 identifies the image and image name 712 is a name of the image that is saved. Benchmark ID 714 identifies the benchmark image the image being saved. Path 716 identifies a path from the block saved for the image identified by image ID 710 and image name 712 to benchmark image identified by benchmark ID 714. This path provides an identification of the subdivision in the benchmark image that corresponds to the block saved for the image.

In this illustrative example, row 718 is for the benchmark image. Row 720 is metadata for image 1 504 in FIG. 5. In this example, block 530 in image 1 520 is saved with this metadata. In row 720, a path from block 628 through block 614 to root block 602 is identified such that a correspondence of block 530, the corresponding block for subdivision in block 535 in benchmark image 502 can be identified. As a result, the reconstruction of image 1 520 can be made by using all of the blocks from benchmark image 502 and inserting block 530 into the position and benchmark image 502 using the position identified by the path in row 720.

As depicted, row 722 is for image 2 506 in FIG. 5. In this example, block 534 in image 2 506 is saved with this metadata and identifies a path from block 620 through block 610 to root block 602. This metadata in row 722 enables re-creating image 2 506 using benchmark image 502 and block 534 stored for image 2 506.

As another example, row 724 is for image 3 504 in FIG. 5. Block 536 and block 538 are saved for image 3 508. Metadata in row 724 describes provides a correspondence of these blocks to block 540 in block 542 in benchmark image 502. The path in row 724 identifies a path in image mapping tree 600 that enables knowing the corresponding locations for these blocks to reconstruct image 3 508 from benchmark image 502 using block 536 and block 538 saved for image 3 508.

The depiction of metadata 700 in the tables is presented as an example a manner in which metadata 700 can be implemented. In another illustrative example, metadata 700 can be organized using other types of data structures including an array, a flat file, a container, or some other suitable type of data structure.

Figure 8:
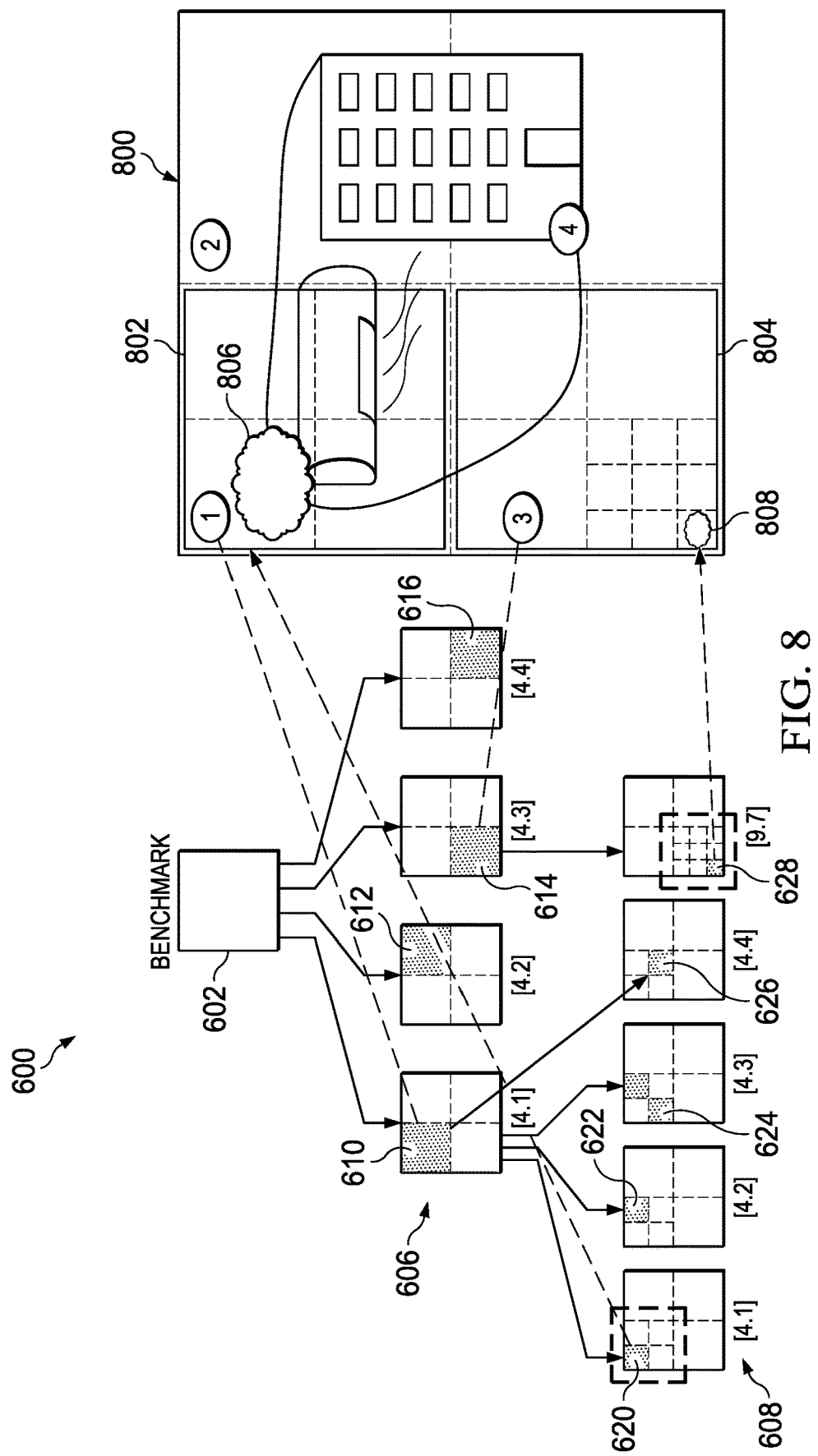
FIG. 8 is a mapping of a new image to an image mapping tree in accordance with an illustrative embodiment.

In FIG. 8, a mapping of a new image to an image mapping tree is illustrated in accordance with an illustrative embodiment. In the illustrative examples, the same reference numeral may be used in more than one figure. This reuse of a reference numeral in different figures represents the same element in the different figures.

In this example, new image 800 has a size of 12 MB and can be saved using image mapping tree 600. In this example, new image 800 can be saved using either first layer 606 or second layer 608 in image mapping tree 600. Second layer 608 provides increased granularity resulting in using less storage space to store new image 800.

For example, when first layer 606 is used, block 802 and block 804 with metadata generated using first layer 606 can be saved such that only a portion of new image 800 is saved. The metadata includes a reference to benchmark image 502. The metadata also includes the path for block 802 is [4.2] and for block 802 is [4.3]. Each of these blocks are 3 MB in size and saving these two blocks uses 6 MB of storage space as compared to 12 MB.

When second layer 608 is used, new image 800 can be further subdivided such that block 806 and block 808 are saved instead of block 802 and block 804. The metadata includes a reference to benchmark image 502. The metadata also includes the path for block 806 is [4.1, 4.1] and the path for block 808 is [4.4,9.7]. With this example, block 806 is ¾ MB and block 808 is ⅜ MB for total of 13/12 MB which results in increased savings over using first layer 606.

Figure 9:
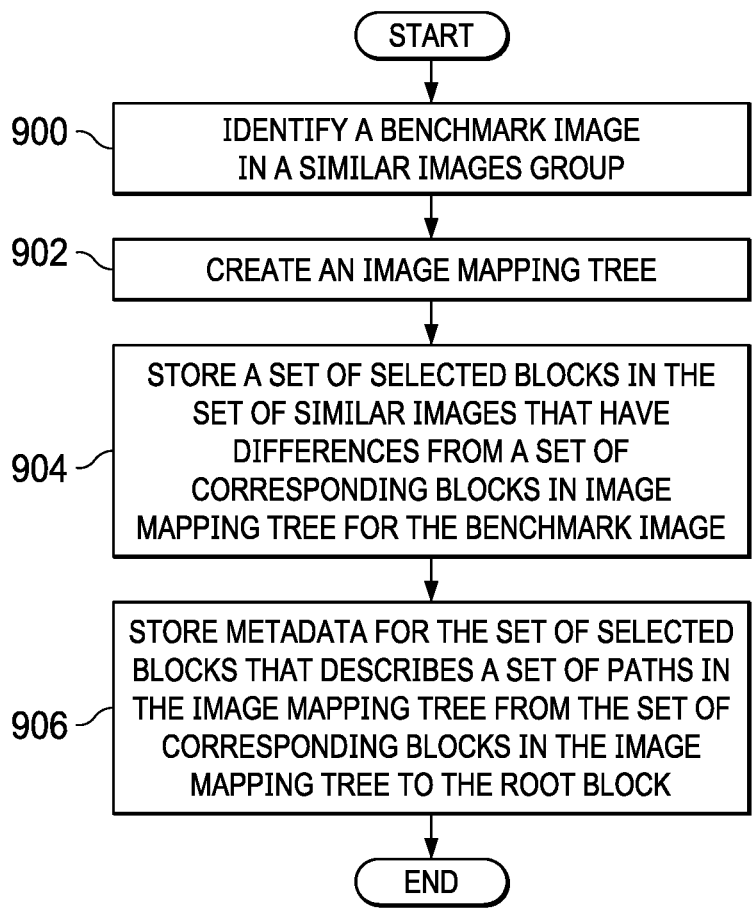
FIG. 9 is a flowchart of a process for managing an image storage space tree in accordance with an illustrative embodiment.

Turning next to FIG. 9, a flowchart of a process for managing an image storage space tree is illustrated in accordance with an illustrative embodiment. The process in FIG. 9 can be implemented in hardware, software, or both. When implemented in software, the process can take the form of program instructions that is run by one or more processor units located in one or more hardware devices in one or more computer systems. For example, the process can be implemented in image manager 408 in computer system 406 in FIG. 4.

The process begins by identifying a benchmark image in a similar images group (step 900). In step 900, a number of other images not identified in the similar images group as the benchmark image is a set of similar images. In step 900, identifying the benchmark image from a plurality of similar images can be performed based on a minimum overall difference between the plurality of similar images. In the illustrative example, the minimum overall difference is determined using at least one of a RGB color histogram method, a keypoint matching method, an image hash method, or a compute the bits method.

The process creates an image mapping tree (step 902). The image mapping tree in step 902 has a root block for the benchmark image and blocks arranged in a set of layers below the root block based on the set of similar images. The blocks represent portions of the benchmark image and a plurality of lower blocks in the blocks in a lower layer correspond to subdivisions in an upper block in the blocks in an upper layer.

The process stores a set of selected blocks in the set of similar images that have differences from a set of corresponding blocks in image mapping tree for the benchmark image (step 904). The process stores metadata for the set of selected blocks that describes set of paths in the image mapping tree from the set of corresponding blocks in the image mapping tree to the root block (step 906). The process terminates thereafter. The metadata can comprise a set of image identifiers for the set of selected blocks, a reference to the benchmark image, and the set of paths in the image mapping tree from the set of corresponding blocks in the image mapping tree to the root block.

Figure 10:
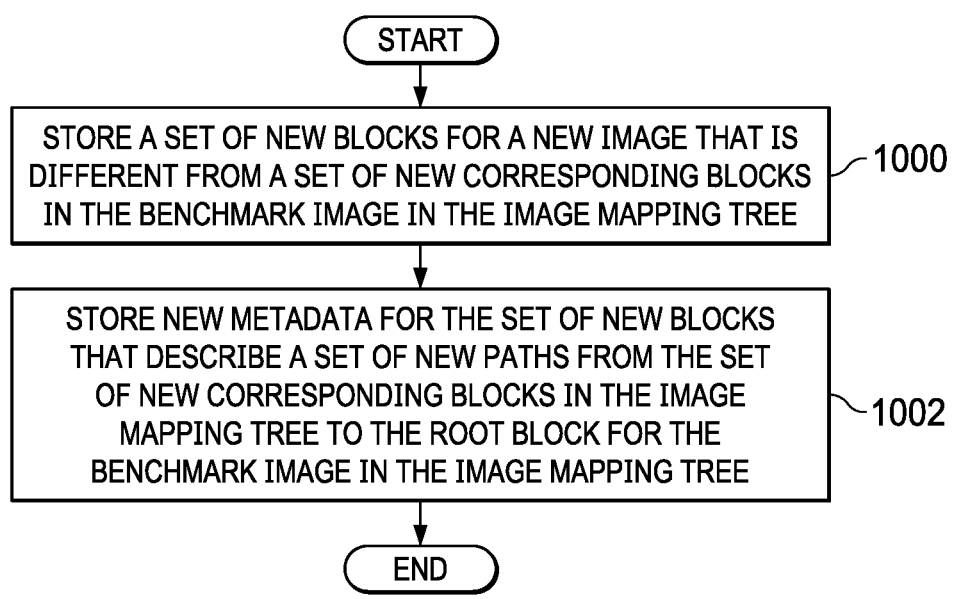
FIG. 10 is a flowchart of a process for storing a new image a new image in accordance with an illustrative embodiment.

With reference to FIG. 10, a flowchart of a process for storing a new image a new image is illustrated in accordance with an illustrative embodiment. This flowchart is an example of additional steps that can be performed in the process in FIG. 9.

The process stores a set of new blocks for a new image that is different from a set of new corresponding blocks in the benchmark image in the image mapping tree (step 1000).

The process stores new meta data for the set of new blocks that describe a set of new paths from the set of new corresponding blocks in the image mapping tree to the root block for the benchmark image in the image mapping tree (step 1002). The process terminates thereafter.

Figure 11:
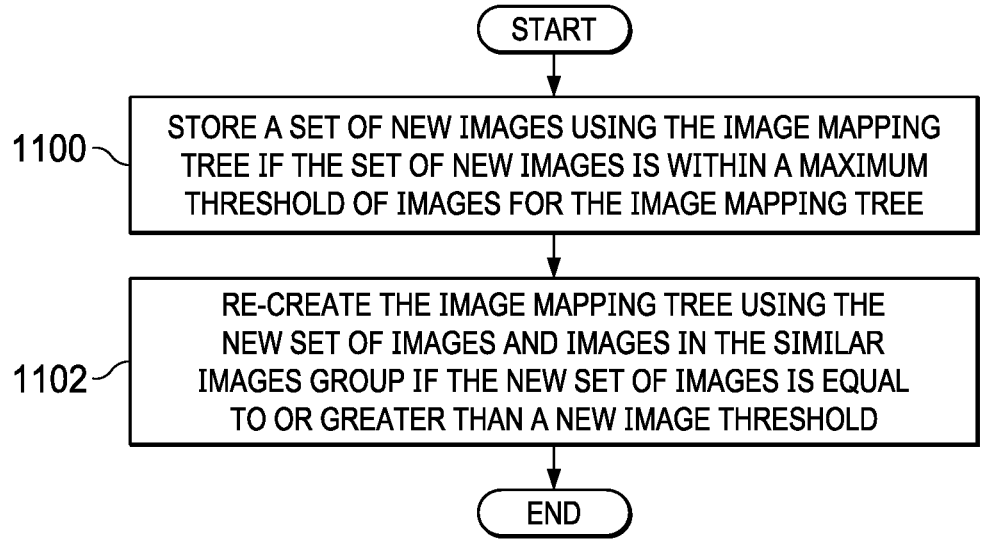
FIG. 11 is a flowchart of a process for processing a set of new images in accordance with an illustrative embodiment.

Next with reference to FIG. 11, a flowchart of a process for processing a set of new images is illustrated in accordance with an illustrative embodiment. This flowchart is an example of additional steps that can be performed in the process in FIG. 9.

The process stores a set of new images using the image mapping tree if the set of new images is within a maximum threshold of images for the image mapping tree (step 1100). The process re-creates the image mapping tree using the new set of images and images in the similar images group if the new set of images is equal to or greater than a new image threshold (step 1102). The process terminates thereafter.

Figure 12:
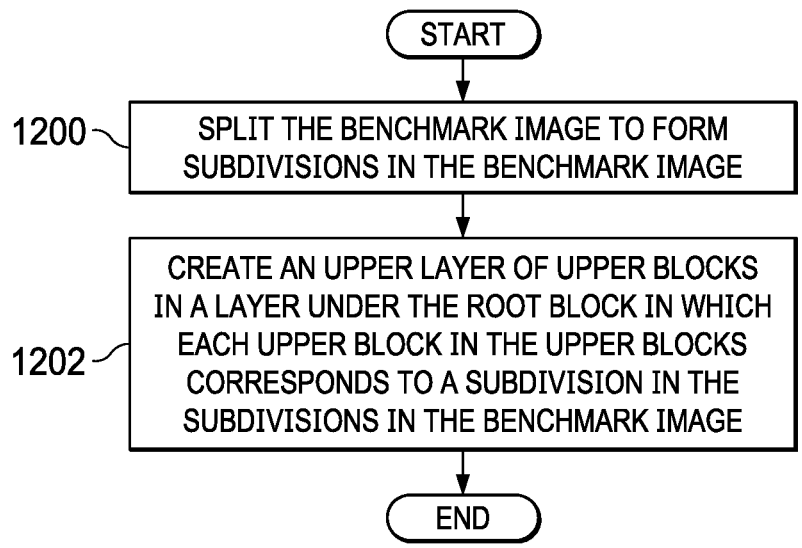
FIG. 12 is a flowchart of a process for creating an image mapping tree in accordance with an illustrative embodiment.

Tuning next to FIG. 12, a flowchart of a process for creating an image mapping tree is illustrated in accordance with an illustrative embodiment. The process illustrated in FIG. 12 is an example of one implementation for creating an image mapping tree in step 902 in FIG. 9.

The process begins by splitting, the benchmark image to form subdivisions in the benchmark image (step 1200). The process creates an upper layer of upper blocks in a layer under the root block in which each upper block in the upper blocks corresponds to a subdivision in the subdivisions in the benchmark image (step 1202). The process terminates thereafter.

Figure 13:
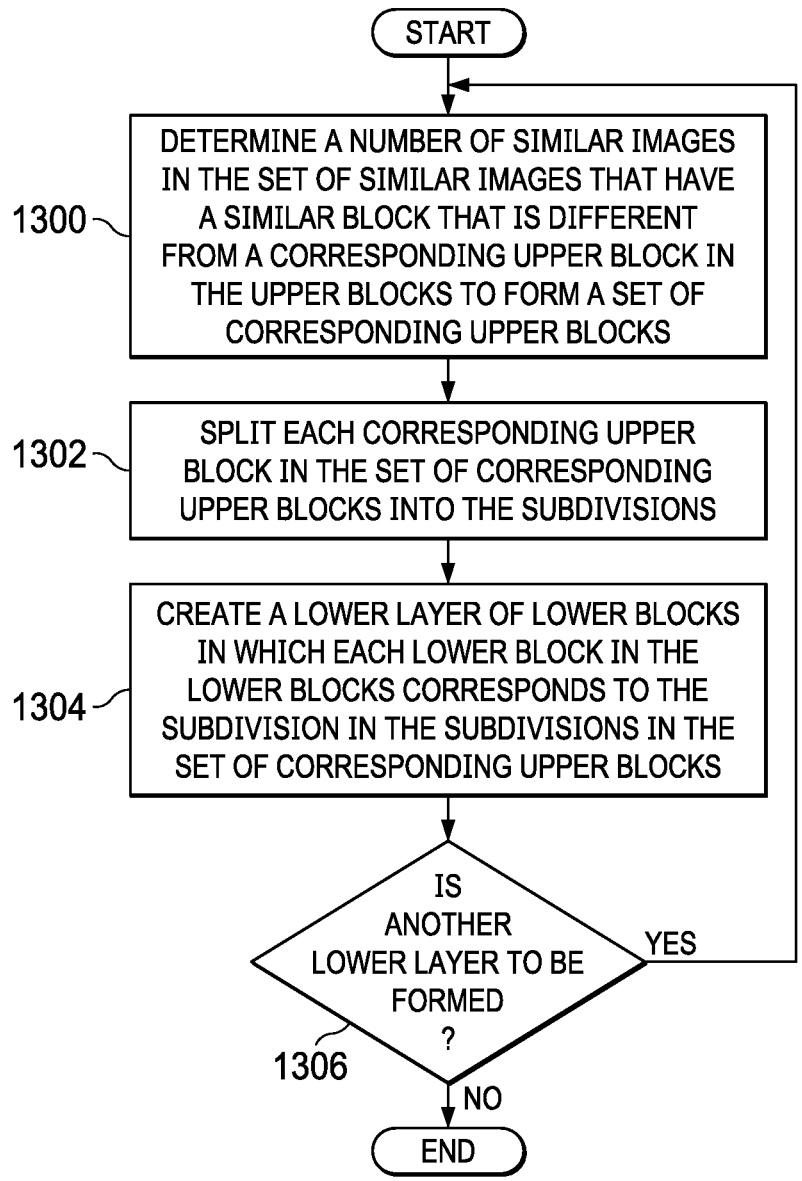
FIG. 13 is a flowchart of a process for creating an image mapping tree in accordance with an illustrative embodiment.

With reference to FIG. 13, a flowchart of a process for creating an image mapping tree is illustrated in accordance with an illustrative embodiment. The process illustrated in FIG. 13 additional steps that can be performed in the process in FIG. 12 for creating an image mapping tree.

The process determines a number of similar images in the set of similar images that have a similar block that is different from a corresponding upper block in the upper blocks to form a set of corresponding upper blocks (step 1300). The process splits each corresponding upper block in the set of corresponding upper blocks into the subdivisions (step 1302). The process creates a lower layer of lower blocks in which each lower block in the lower blocks corresponds to the subdivision in the subdivisions in the set of corresponding upper blocks (step 1304).

A determination is made as to whether another lower layer is to be formed (step 1306). This determination can be made any number of different ways. For example, the determination can be based on storage produced and processing resources used. A balance between these two factors can be analyzed to determine whether the storage reduced versus the processing resources used warrant creating another layer for the image decision tree.

If another lower layer is to be formed for the image decision tree, the lower blocks become the upper blocks for splitting when creating a subsequent lower layer and the process then returns to step 1300. With reference again to step 1306, if another layer is not to be created, the process terminates.

Figure 14A:
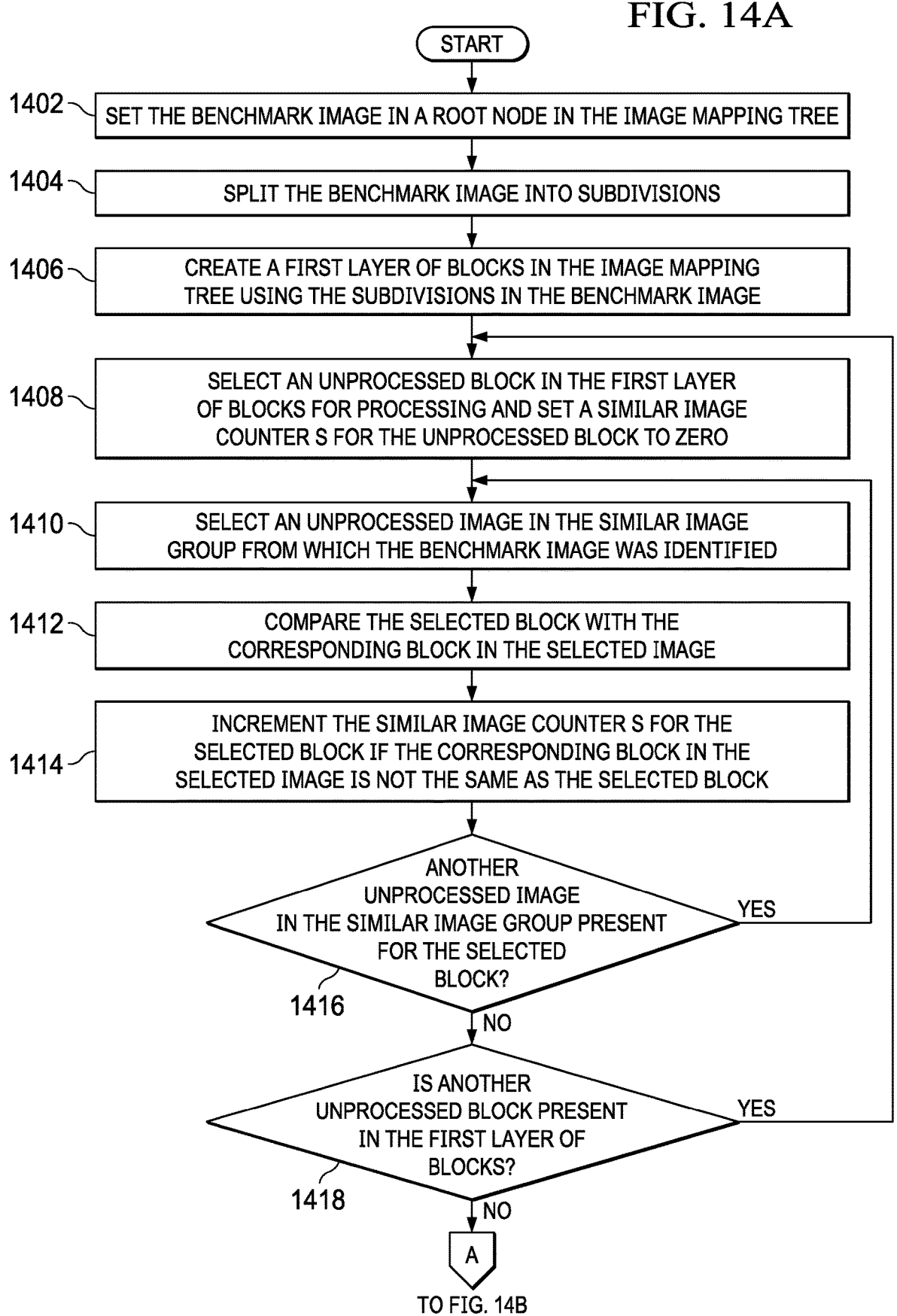
FIGS. 14A and 14B is a flowchart of process for creating process for creating an image mapping tree in accordance with an illustrative embodiment.
Figure 14B:
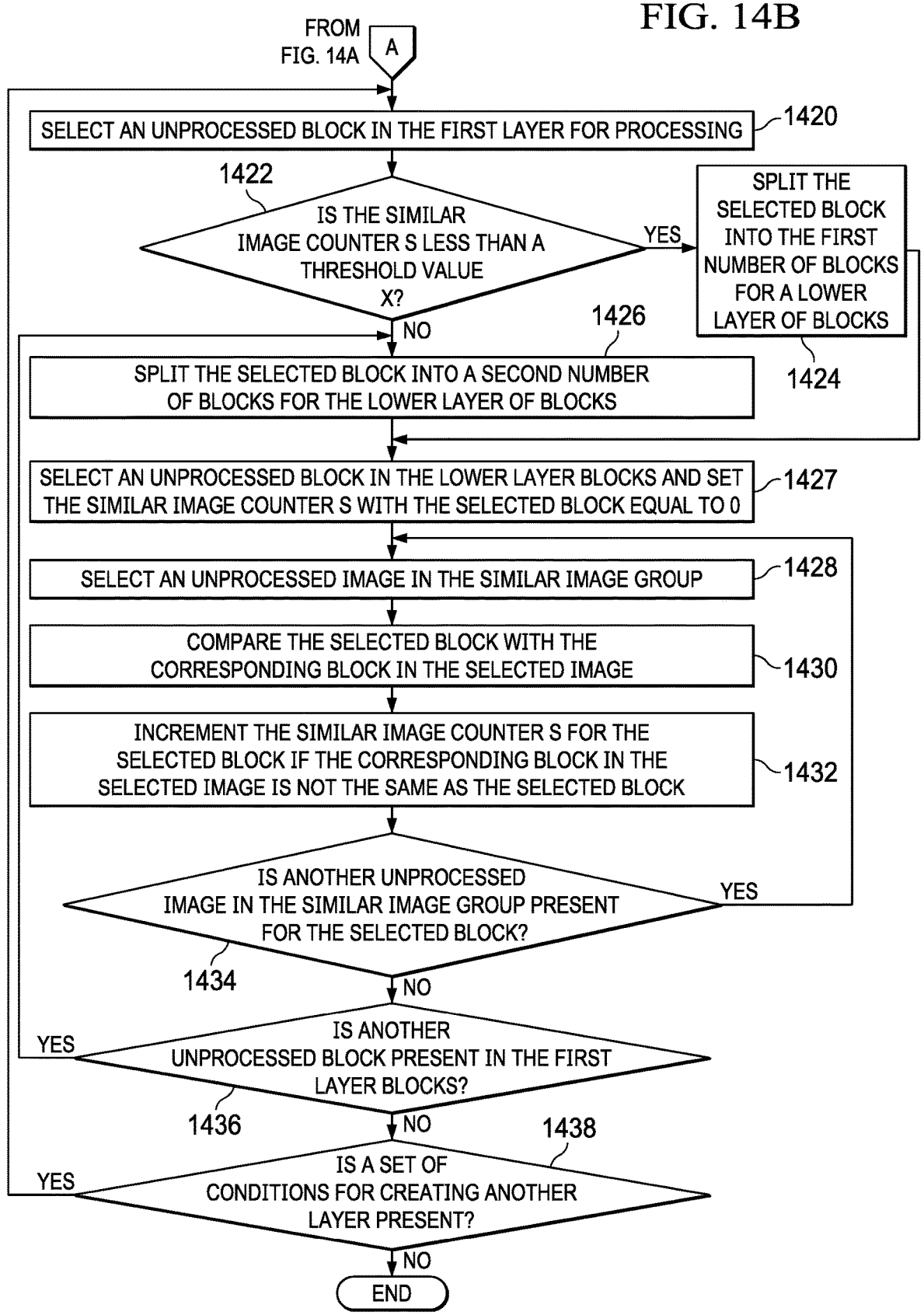

With reference next to FIGS. 14A and 14B, a flowchart of process for creating process for creating an image mapping tree is illustrated in accordance with an illustrative embodiment. The process illustrated in FIGS. 14A and 14B is an example of one implementation for creating an image mapping tree in step 902 in FIG. 9.

The process begins by setting the benchmark image in a root node in the image mapping tree (step 1402). The process then splits the benchmark image into subdivisions (step 1404). In step 1404, the benchmark image can be split into four subdivisions. The process then creates a first layer of blocks in the image mapping tree using the subdivisions in the benchmark image (step 1406). In step 1406, each block corresponds to a subdivision in the benchmark image. For example, if the benchmark image is split into four subdivisions, four blocks are present in the first layer of blocks in which each block corresponds to one of the four subdivisions.

The process then selects an unprocessed block in the first layer of blocks for processing and sets a similar image counter S for the unprocessed block to 0 (step 1408). The process then selects an unprocessed image in the similar image group from which the benchmark image was identified (step 1410). The process compares the selected block with the corresponding block in the selected image (step 1412). The process increments the similar image counter S for the selected block if the corresponding block in the selected image is not the same as the selected block (step 1414).

The process determines whether another unprocessed image in the similar image group is present for the selected block (step 1416.) If another unprocessed image is present for this selected block, the process then returns to step 1410. Otherwise, a determination is made as to whether another unprocessed block is present in the first layer blocks (step 1418). If another unprocessed block is present, the process then returns to step 1408 as described above.

In step 1418, if another unprocessed block is not present, the process selects an unprocessed block in the first layer for processing (step 1420). The process determines whether the similar image counter S is less than a threshold value X (step 1422). If the similar image counter S is less than the threshold X, the process splits the selected block into the first number of blocks for a lower layer of blocks (step 1424). If the similar image counter S is equal to or greater than the threshold X, then the process splits the selected block into a second number of blocks for the lower layer of blocks (step 1426).

In one example, the block can be split into 4 blocks for the first number of blocks. The block can be split into 9 blocks for the second number of blocks. In those of example, all of the subdivisions in a single block are the same size. The subdivisions all have the same dimensions within the block.

The type of splitting can vary depending on the particular implementation. In other examples, the first number blocks can be 9 blocks and the second number second number blocks can be 25 blocks or 36 blocks, or some other number blocks. The number of blocks can vary depending on the particular implementation. A single number of blocks can be used, or three or more different numbers of blocks can be used in other illustrative examples.

After splitting the selected block in step 1424 or step 1426, the process proceeds to select an unprocessed block in the lower layer blocks and set the similar image counter S with the selected block equal to 0 (step 1427). The process selects an unprocessed image in the similar image group (step 1428).

The process compares the selected block with the corresponding block in the selected image (step 1430). The process increments the similar image counter S for the selected block if the corresponding block in the selected image is not the same as the selected block (step 1432).

The process determines whether another unprocessed image in the similar image group is present for the selected block (step 1434.) If another unprocessed image is present for this selected block, the process then returns to step 1428.

Otherwise, a determination is made as to whether another unprocessed block is present in the first layer blocks (step 1436). If another unprocessed block is present, the process then returns to step 1427 as described above.

Otherwise, a determination is made as to whether a set of conditions for creating another layer is present (step 1438). If the set of conditions for creating another layer is present, the process returns to step 1420. Otherwise, the process terminates, and the image mapping tree is complete.

In step 1436, the set of conditions can be one or more conditions that are based on the amount of storage reduced and the amount of processing resources used. These factors can be used to determine whether demand storage produced warrants creating another layer versus the processing resources used to create that layer. The set of conditions can include at least one of whether ratio of time to image size is less than a pre-defined threshold R, time is less than a pre-define threshold T (Max Time to Build Decision Tree), the number of current layers is less than a pre-defined threshold L (Max Layer Number), or some other expression that takes into account the amount of storage reduced in the amount of processing resources used.

Figure 15:
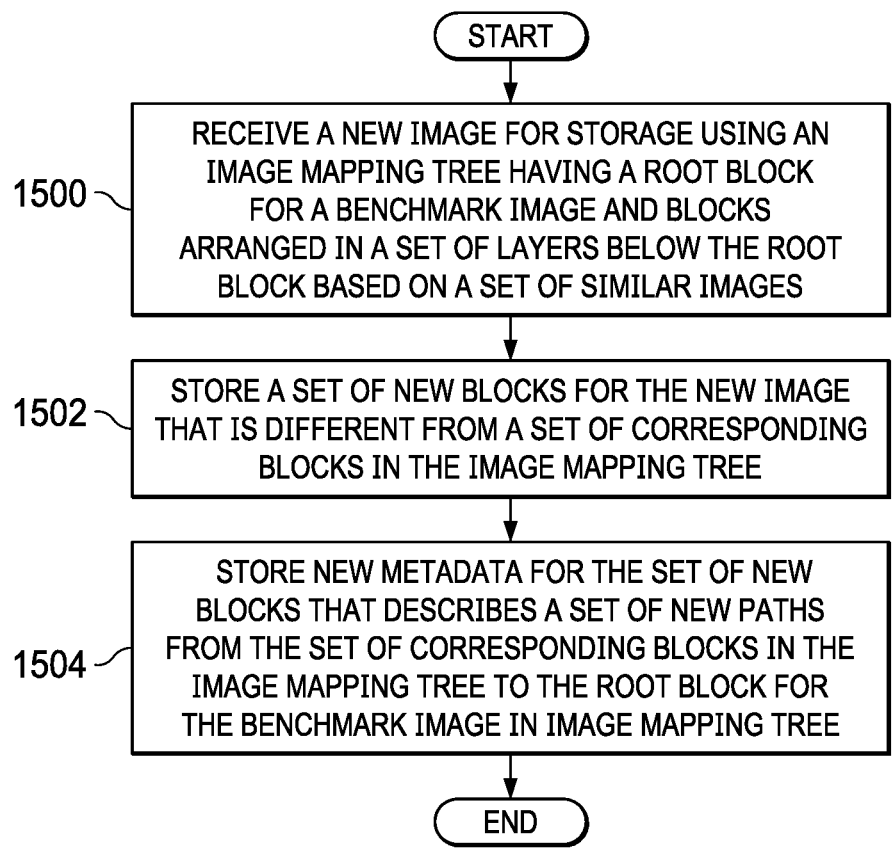
FIG. 15 is a flowchart of a process for managing an image storage space tree in accordance with an illustrative embodiment.

With reference now to FIG. 15, a flowchart of a process for managing an image storage space tree is illustrated in accordance with an illustrative embodiment. The process in FIG. 15 can be implemented in hardware, software, or both. When implemented in software, the process can take the form of program instructions that is run by one or more processor units located in one or more hardware devices in one or more computer systems. For example, the process can be implemented in image manager 408 in computer system 406 in FIG. 4.

The process begins by receiving a new image for storage using an image mapping tree having a root block for a benchmark image and blocks arranged in a set of layers below the root block based on a set of similar images (step 1500). In step 1500, the blocks represent portions of the benchmark image and a plurality of lower blocks in the blocks in a lower layer correspond to subdivisions in an upper block in the blocks in an upper layer.

The process stores a set of new blocks for the new image that is different from a set of corresponding blocks in the image mapping tree (step 1502). The process stores new meta data for the set of new blocks that describes a set of new paths from the set of corresponding blocks in the image mapping tree to the root block for the benchmark image in image mapping tree. (step 1504). The process terminates thereafter.

Figure 16A:
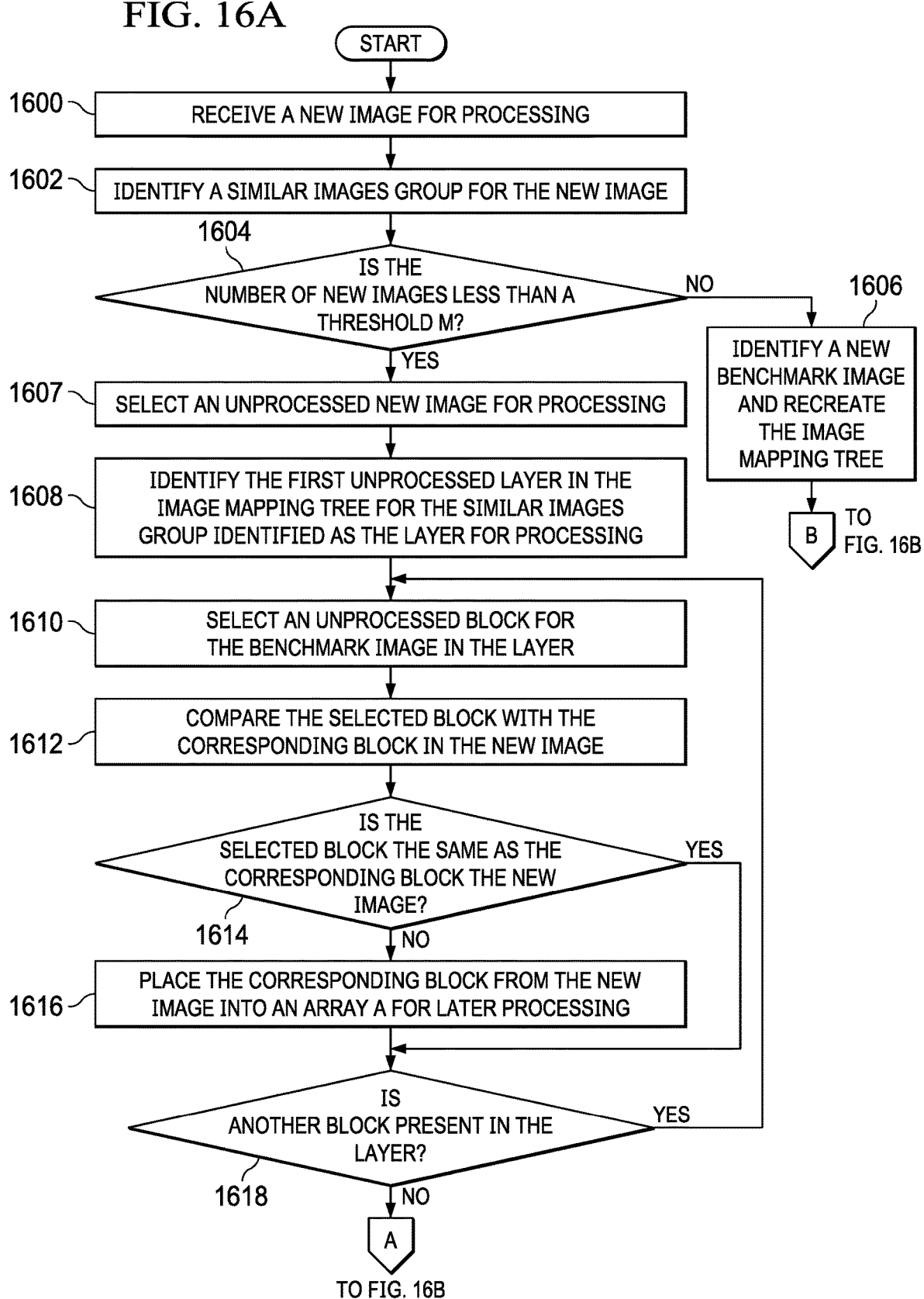
FIGS. 16A and 16B is a flowchart of a process for managing an image storage space tree to process a new manage in accordance with an illustrative embodiment.
Figure 16B:
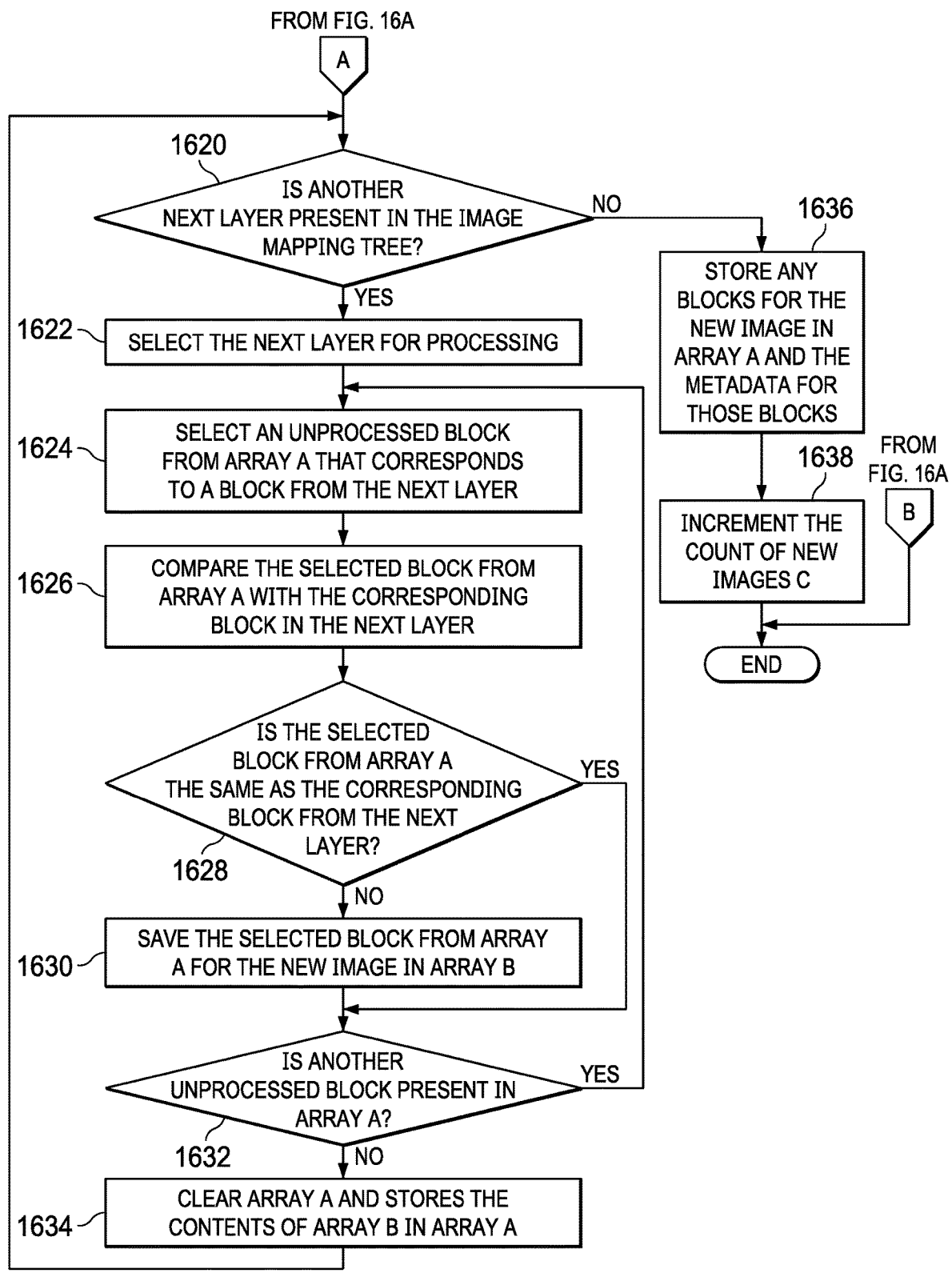

With reference now to FIGS. 16A and 16B, a flowchart of a process for managing an image storage space tree to process a new manage is illustrated in accordance with an illustrative embodiment. The process in FIGS. 16A and 16B can be implemented in hardware, software, or both. When implemented in software, the process can take the form of program instructions that is run by one or more processor units located in one or more hardware devices in one or more computer systems. For example, the process can be implemented in image manager 408 in computer system 406 in FIG. 4 to store. This process can be performed for each new image received for processing. The new image may be received as an image already stored to determine whether further efficiencies can be obtained. The process can also be performed for new image received for storage The process begins by receiving a new image for processing (step 1600). The process identifies a similar images group for the new image (step 1602). In step 1602, a similar images group can be used by comparing the set of new image to images within different similar images groups. For example, a minimum overall difference can be used to identify a similar images group that is most similar to the new image. If only a single similar images group is present, that group is identified in step 1602.

The process determines whether the number of new images is less than a threshold M (step 1604). If the number of new images is equal to or greater than the threshold M, a new benchmark image is identified and the image mapping tree is re-created (step 1606) with the process determining thereafter. The re-creating of the image mapping tree is performed in steps in FIG. 13 or FIGS. 14A and 14B.

If the number of new images is less than the new image threshold M, the process selects an unprocessed new image for processing (step 1607). The process identifies the first unprocessed layer in the image mapping tree for the similar images group identified as the layer for processing (step 1608). The first unprocessed layer is the first layer in the image mapping tree that has not been used to determine whether matches are present between blocks in the layer and corresponding blocks in an image.

The process selects an unprocessed block for the benchmark image in the layer (step 1610). The process compares the selected block with the corresponding block in the new image (step 1612). A determination is made as to whether the selected block is the same as the corresponding block the new image (step 1614). In step 1614, blocks that are the same between the block for the benchmark image in the corresponding block the new image do not need to be saved.

If the selected block is not the same as the corresponding block in the new image, the process places the corresponding block from the new image into an array A for later processing (steep 1616). In other words, one or more differences are present between the selected block and corresponding block. In saving the corresponding block, metadata can also be saved. For example, a reference to the root block containing the benchmark image, an identifier of the new image, and a path from the selected block to the root image can be saved as metadata.

The process determines whether another block is present in the layer (step 1618). If another block is present, the process returns to step 1610. The process also proceeds to step 1618 from step 1614 if the selected block is the same as the corresponding block.

Otherwise, the process determines whether another next layer is present in the image mapping tree (step 1620). If another next layer is present, the process selects the next layer for processing (step 1622).

The process selects an unprocessed block from array A that corresponds to a block from the next layer (step 1624). In step 1624 the block selected is a subdivision of the block previously saved in array A for the new image. In this step, the smaller block is selected to perform comparisons with blocks in the next layer.

The process compares the selected block from array A with the corresponding block in the next layer (step 1626). The process determines whether the selected block from array A is the same as the corresponding block from the next layer (step 1628).

If the selected block from array A is not the same as the corresponding block in the next layer, the process saves the selected block from array A for the new image in array B (step 1630). A determination is made as to whether another unprocessed block is present in array A (step 1632). If another unprocessed block is present in array A, the process returns to step 1624.

If another unprocessed block is not present in array A, the process clears array A and stores the contents of array B in array A (step 1634). The process returns to step 1620 as described above.

With reference again to step 1620, if another next layer is not present in the image mapping tree, the process stores any blocks for the new image in array A and the metadata for those blocks (step 1636). The metadata can and identify the benchmark image and information identifying a path from the block to the root block containing the benchmark image. Process increments the count of new images C (step 1638). In step 1638, this count is used to count the number new images that maybe stored using the image mapping tree. In other words, the counter is not reset after the process terminates but is for tracking new images that are presented for processing using the image mapping tree. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 17:
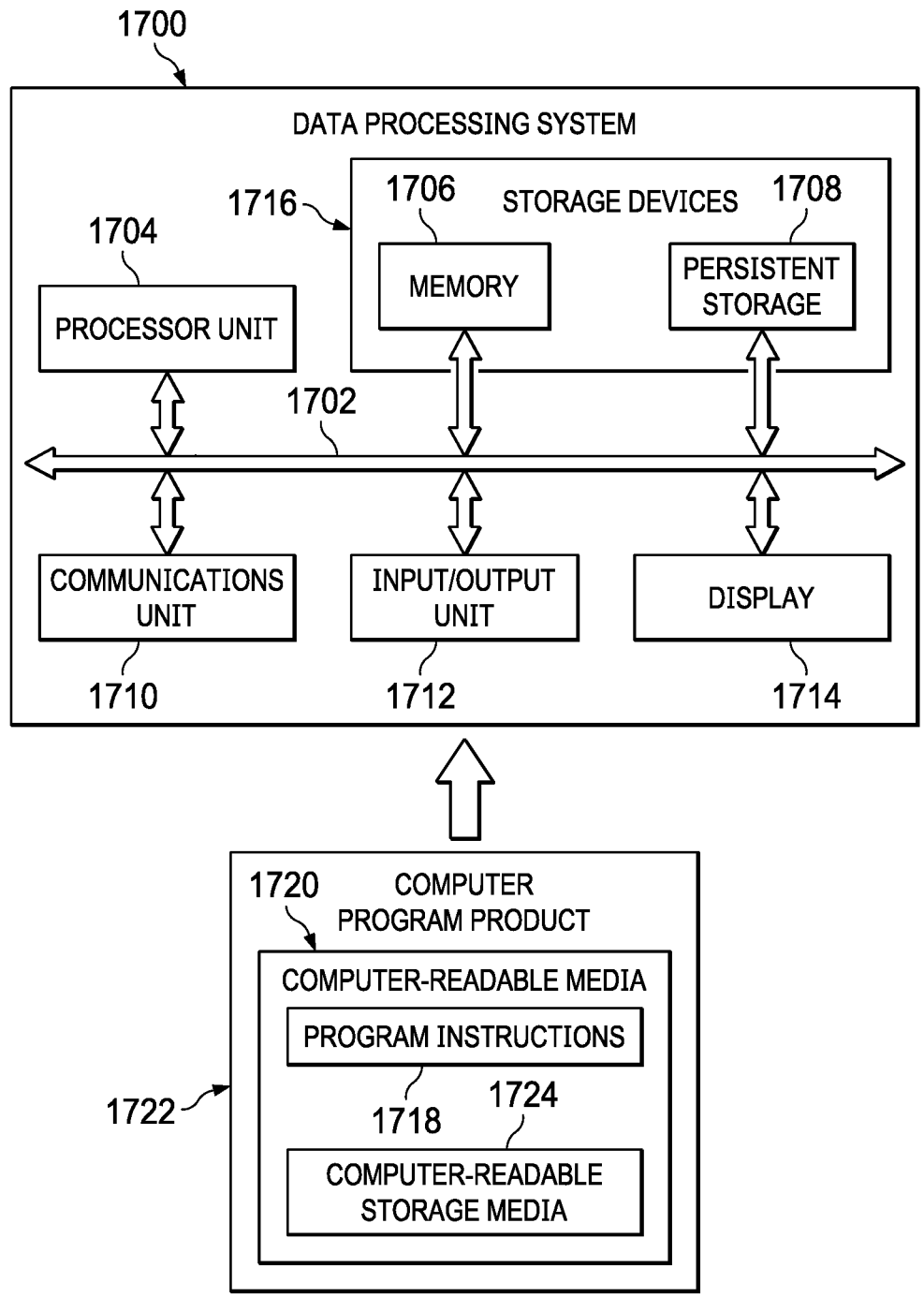
FIG. 17 is a block diagram of a data processing system in accordance with an illustrative embodiment.

Turning now to FIG. 17, a block diagram of a data processing system is illustrated in accordance with an illustrative embodiment. Data processing system 1700 can be used to implement cloud computing nodes 110 in FIG. 1, personal digital assistant (PDA) or smart phone 120A, desktop computer 120B, laptop computer 120C, and/or automobile computer system 120N in FIG. 1. Data processing system 1700 can be used to implement computers in hardware and software layer 202 in FIG. 2 as well as server computer 304, server computer 306, and client devices 310 in FIG. 3. Data processing system 1700 can also be used to implement computer system 406 in FIG. 4. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer-readable program instructions that can be read and executed by a processor in processor unit 1704. The program instructions in the different embodiments can be embodied on different physical or computer-readable storage media, such as memory 1706 or persistent storage 1708.

Program instructions 1718 is located in a functional form on computer-readable media 1720 that is selectively removable and can be loaded onto or transferred to data processing system 1700 for execution by processor unit 1704. Program instructions 1718 and computer-readable media 1720 form computer program product 1722 in these illustrative examples. In the illustrative example, computer-readable media 1720 is computer-readable storage media 1724.

Computer-readable storage media 1724 is a physical or tangible storage device used to store program instructions 1718 rather than a medium that propagates or transmits program instructions 1718. Computer-readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1718 can be transferred to data processing system 1700 using a computer-readable signal media. The computer-readable signal media are signals and can be, for example, a propagated data signal containing program instructions 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program instructions 1718 can be located in computer-readable media 1720 in the form of a single storage device or system. In another example, program instructions 1718 can be located in computer-readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer-readable media 1720 in a server computer while another portion of program instructions 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Thus, illustrative embodiments of the present invention provide a computer implemented method, computer system, and computer program product for managing an image storage space is provided. A number of processor units identifies a benchmark image in a similar images group. A number of other images not identified in the similar images group as the benchmark image is a set of similar images. The number of processor units creates an image mapping tree. The image mapping tree has a root block for the benchmark image and blocks arranged in a set of layers below the root block based on the set of similar images; the blocks represent portions of the benchmark image; and a plurality of lower blocks in the blocks in a lower layer correspond to subdivisions in an upper block in the blocks in an upper layer. The number of processor units stores a set of selected blocks in the set of similar images that have differences from a set of corresponding blocks in image mapping tree for the benchmark image. The number of processor units store metadata for the set of selected blocks that describes set of paths in the image mapping tree from the set of corresponding blocks in the image mapping tree to the root block.

As a result, the illustrative embodiments can provide technical effect of increasing performance in a computer system by reducing the amount of image storage space needed through storing portions of similar images. In one or more illustrative examples, an image mapping tree is used to identify blocks in images that are similar to blocks in a benchmark image. These blocks are saved along with metadata identifying the benchmark image and a path to the benchmark image in the image mapping tree. As a result, the amount of storage space needed to say images can be reduce through the use of this image mapping tree to identify save blocks in images that are not the same or identical to corresponding blocks in a benchmark image while blocks that are the same between the images and corresponding blocks in the benchmark images are not saved.

As a result, one or more one or more illustrative examples can employ an image mapping tree to reduce the amount of storage needed to store images with improvements over current techniques for storing images. By storing images using an image mapping tree, the amount of storage space can be reduced as well as increasing the speed at which images can be transferred. Further, one more dose of examples can be used to balance increased efficiency and storage against the use of processor resources to obtain an optimal storage solution.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing an image storage space, the computer implemented method comprising:

identifying, by a number of processor units, a benchmark image in a similar images group, wherein a number of other images are not identified in the similar images group as the benchmark image in a set of similar images;

creating, by the number of processor units, an image mapping tree, wherein the image mapping tree has a root block for the benchmark image and blocks arranged in a set of layers below the root block based on the set of similar images, the blocks represent portions of the benchmark image, and a plurality of lower blocks in the blocks in a lower layer correspond to subdivisions in an upper block in the blocks in an upper layer; and storing, by the number of processor units, a set of selected blocks in the set of similar images that have differences from a set of corresponding blocks in image mapping tree for the benchmark image; and storing, by the number of processor units, metadata for the set of selected blocks that describes a set of paths in the image mapping tree from the set of corresponding blocks in the image mapping tree to the root block.

2. The computer implemented method of claim 1 further comprising:

storing, by the number of processor units, a set of new blocks for a new image that is different from a set of new corresponding blocks in the benchmark image in the image mapping tree; and storing, by the number of processor units, new meta data for the set of new blocks that describe a set of new paths from the set of new corresponding blocks in the image mapping tree to the root block for the benchmark image in the image mapping tree.

3. The computer implemented method of claim 1 further comprising:

storing, by the number of processor units, a set of new images using the image mapping tree if the set of new images is within a maximum threshold of images for the image mapping tree.

4. The computer implemented method of claim 3 further comprising:

recreating, by the number of processor units, the image mapping tree using the new set of images and images in the similar images group if the new set of images is equal to or greater than a new image threshold.

5. The computer implemented method of claim 1, wherein creating, by the number of processor units, the image mapping tree for the similar images group comprises:

splitting, by the number of processor units, the benchmark image to form subdivisions in the benchmark image; and creating an upper layer of upper blocks in a layer under the root block in which each upper block in the upper blocks corresponds to a subdivision in the subdivisions in the benchmark image.

6. The computer implemented method of claim 5, wherein creating, by the number of processor units, the image mapping tree for the similar images group further comprises:

determining, by the number of processor units, a number of similar images in the set of similar images that have a similar block that is different from a corresponding upper block in the upper blocks to form a set of corresponding upper blocks;

splitting, by the number of processor units, each corresponding upper block in set of corresponding upper blocks into the subdivisions; and creating, by the number of processor units, a lower layer of lower blocks in which each lower block in the lower blocks corresponds to the subdivision in the subdivisions in the set of corresponding upper blocks.

7. The computer implemented method of claim 6, wherein the lower blocks become the upper blocks for splitting when creating a subsequent lower layer and further comprising:

repeating, by the number of processor units, the determining, splitting, and creating steps to form the subsequent lower layer.

8. The computer implemented method of claim 6 further comprising:

repeating, by the number of processor units, the determining, splitting, and creating steps to form another lower layer based on storage reduced and processing resources used.

9. The computer implemented method of claim 6, wherein a number of the lower blocks formed from splitting an upper block is based on the number of similar images having the similar block for the upper block being split.

10. The computer implemented method of claim 1, wherein the metadata comprises a set of image identifies for the set of selected blocks, a reference to the benchmark image, and the set of paths in the image mapping tree from the set of corresponding blocks in the image mapping tree to the root block.

11. The computer implemented method of claim 1, wherein identifying, by the number of processor units, the benchmark image in the similar images group comprises:

identifying, by the number of processor units, the benchmark image from a plurality of similar images based on a minimum overall difference between the plurality of similar images.

12. The computer implemented method of claim 11, wherein the minimum overall difference determined using at least one of a RGB color histogram method, a keypoint matching method, an image hash method, or a compute the bits method.

13. A computer implemented method for managing an image storage space, the computer implemented method comprising:

receiving, by a number of processor units, a new image for storage using an image mapping tree having a root block for a benchmark image and blocks arranged in a set of layers below the root block based on a set of similar images, wherein the blocks represent portions of the benchmark image and a plurality of lower blocks in the blocks in a lower layer correspond to subdivisions in an upper block in the blocks in an upper layer;

storing, by the number of processor units, a set of new blocks for the new image that is different from a set of corresponding blocks in the image mapping tree; and storing, by the number of processor units, new meta data for the set of new blocks that describes a set of new paths from the set of corresponding blocks in the image mapping tree to the root block for the benchmark image in the image mapping tree.

14. A computer system comprising:

comprising a number of processor units, wherein the number of processor units executes program instructions to:

identifying, the number of processor units, a benchmark image in a similar images group, wherein a number of other images are not identified in the similar images group as the benchmark image is a set of similar images;

creating, by the number of processor units, an image mapping tree, wherein the image mapping tree has a root block for the benchmark image and blocks arranged in a set of layers below the root block based on the set of similar images, the blocks represent portions of the benchmark image, and a plurality of lower blocks in the blocks in a lower layer correspond to subdivisions in an upper block in the blocks in an upper layer; and storing, by the number of processor units, a set of selected blocks in the set of similar images that have differences from a set of corresponding blocks in image mapping tree for the benchmark image; and storing, by the number of processor units, metadata for the set of selected blocks that describes set of paths in the image mapping tree from the set of corresponding blocks in the image mapping tree to the root block.

15. The computer system of claim 14 further comprising: storing, by the number of processor units, a set of new blocks for a new image that is different from a set of new corresponding blocks in the benchmark image in the image mapping tree; and storing, by the number of processor units, new meta data for the set of new blocks that describe a set of new paths from the set of new corresponding blocks in the image mapping tree to the root block for the benchmark image in the image mapping tree.

16. The computer system of claim 14 further comprising: storing, by the number of processor units, a set of new images using the image mapping tree if the set of new images is within a maximum threshold of images for the image mapping tree.

17. The computer system of claim 16 further comprising: recreating, by the number of processor units, the image mapping tree using the new set of images and images in the similar images group if the new set of images is equal to or greater than a new image threshold.

18. The computer system of claim 14, wherein creating, by the number of processor units, the image mapping tree for the similar images group comprises:

splitting, by the number of processor units, the benchmark image to form subdivisions in the benchmark image; and creating an upper layer of upper blocks in a layer under the root block in which each upper block in the upper blocks corresponds to a subdivision in the subdivisions in the benchmark image.

19. The computer system of claim 18, wherein creating, by the number of processor units, the image mapping tree for the similar images group further comprises:

determining, by the number of processor units, a number of similar images in the set of similar images that have a similar block that is different from a corresponding upper block in the upper blocks to form a set of corresponding upper blocks;

splitting, by the number of processor units, each corresponding upper block in set of corresponding upper blocks into the subdivisions; and creating a lower layer of lower blocks in which each lower block in the lower blocks corresponds to the subdivision in the subdivisions in the set of corresponding upper blocks.

20. The computer system of claim 19, wherein the lower blocks become the upper blocks for splitting when creating a subsequent lower layer and further comprising:

repeating, by the number of processor units, the determining, splitting, and creating steps to form the subsequent lower layer.

21. The computer system of claim 19 further comprising: repeating, by the number of processor units, the determining, splitting, and creating steps to form another lower layer based on storage reduced and processing resources used.

22. The computer system of claim 19, wherein a number of the lower blocks formed from splitting an upper block is based on the number of similar images having the similar block for the upper block being split.

23. The computer system of claim 14, wherein the metadata comprises a set of image identifies for the set of selected blocks, a reference to the benchmark image, and the set of paths in the image mapping tree from the set of corresponding blocks in the image mapping tree to the root block.

24. A computer system comprising:
a number of processor units, wherein the number of processor units executes program instructions to:
receive a new image for storage using an image mapping tree having a root block for a benchmark image and blocks arranged in a set of layers below the root block based on a set of similar images, wherein the blocks represent portions of the benchmark image and a plurality of lower blocks in the blocks in a lower layer correspond to subdivisions in an upper block in the blocks in an upper layer;
store a set of new blocks for the new image that is different from a set of corresponding blocks in the image mapping tree; and
store new meta data for the set of new blocks that describes a set of new paths from the set of corresponding blocks in the image mapping tree to the root block for the benchmark image in the image mapping tree.

25. A computer program product for managing an image storage space, the computer program product comprising a computer-readable storage medium having program instructions embodied therewith, the program instructions executable by a computer system to cause the computer system to perform a method of:

identifying, a number of processor units, a benchmark image in a similar images group, wherein a number of other images are not identified in the similar images group as the benchmark image is a set of similar images;

creating, by the number of processor units, an image mapping tree, wherein the image mapping tree has a root block for the benchmark image and blocks arranged in a set of layers below the root block based on the set of similar images, the blocks represent portions of the benchmark image, and a plurality of lower blocks in the blocks in a lower layer correspond to subdivisions in an upper block in the blocks in an upper layer; and storing, by the number of processor units, a set of selected blocks in the set of similar images that have differences from a set of corresponding blocks in image mapping tree for the benchmark image; and storing, by the number of processor units, metadata for the set of selected blocks that describes set of paths in the image mapping tree from the set of corresponding blocks in the image mapping tree to the root block.

* * * * *